Jan. 18, 1949.  S. N. WIGHT ET AL  2,459,399
AIRWAYS TRAFFIC CONTROL SYSTEM
Filed Dec. 24, 1942  9 Sheets-Sheet 4
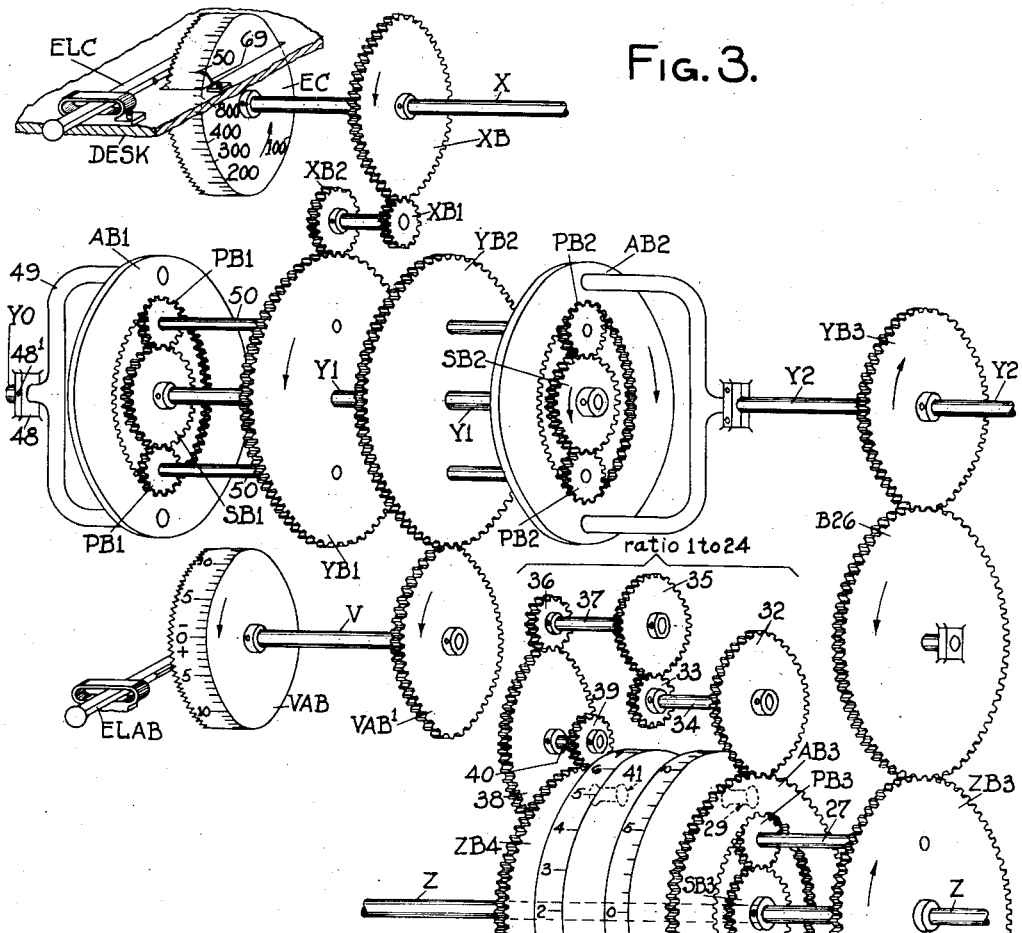
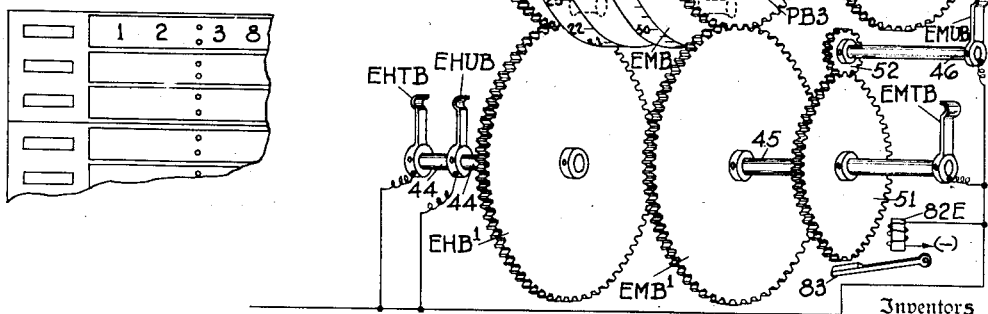
Inventors
S. N. Wight and O. S. Field
By Neil W. Preston,
THEIR Attorney

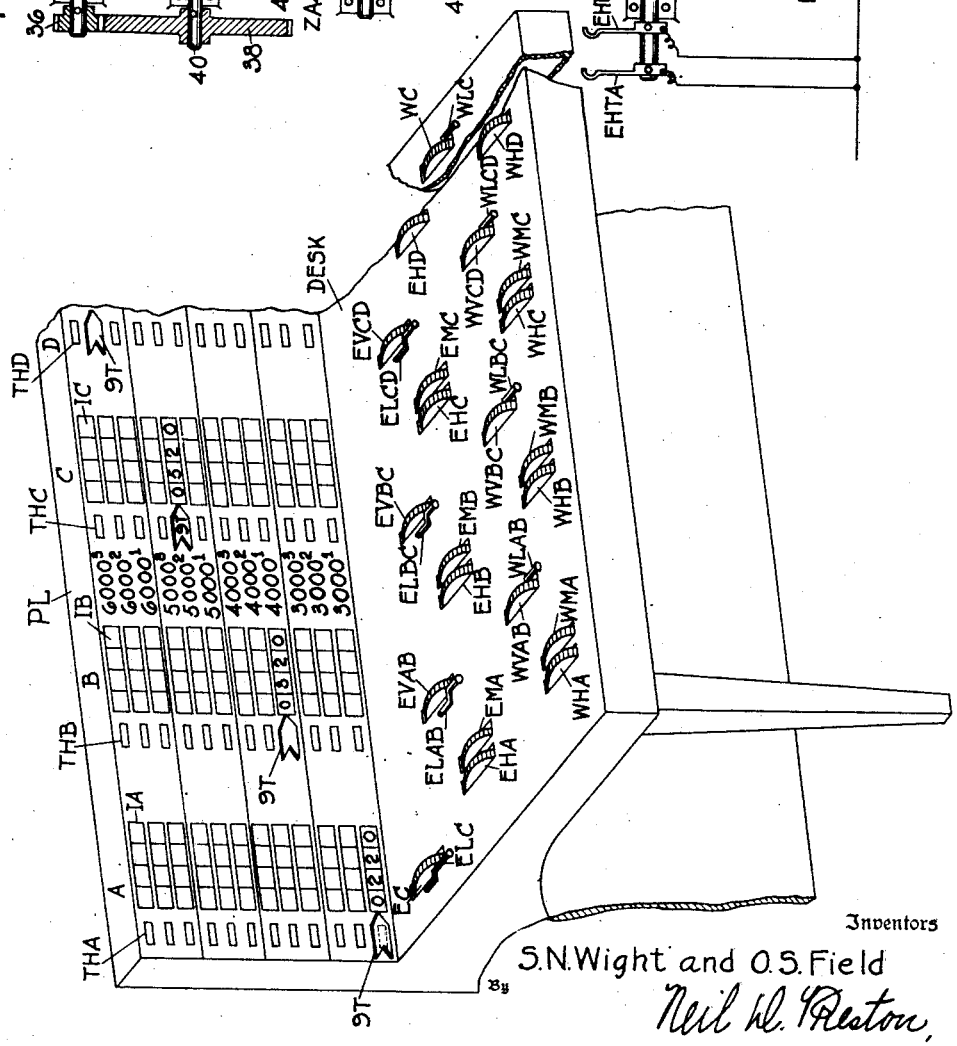

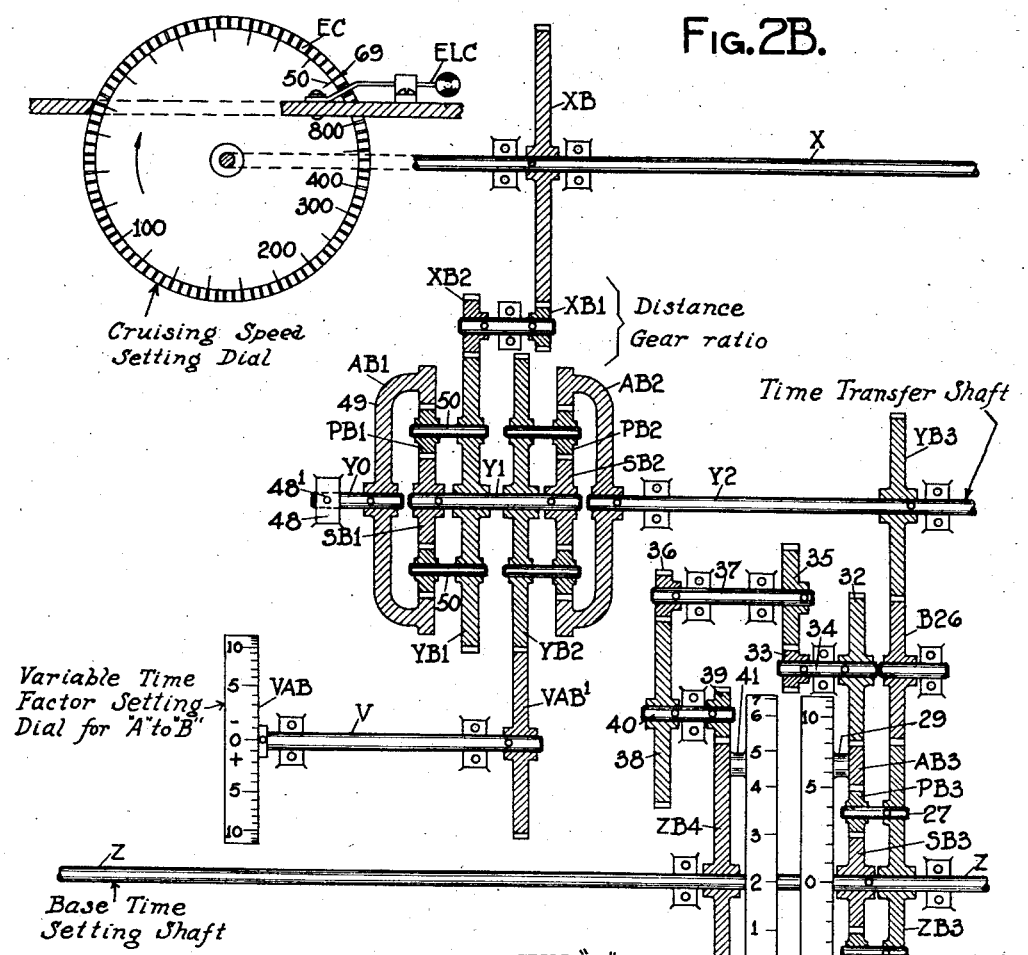
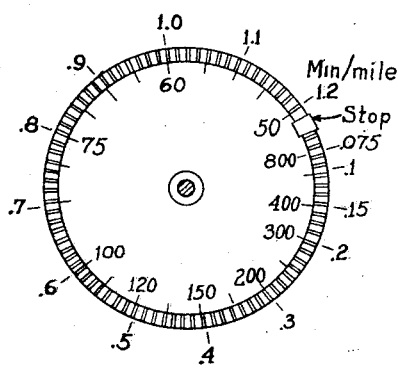
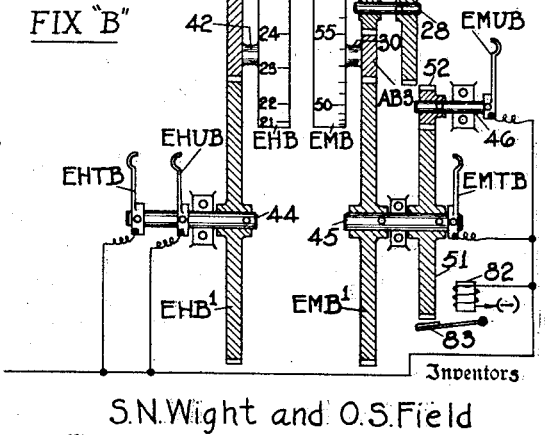

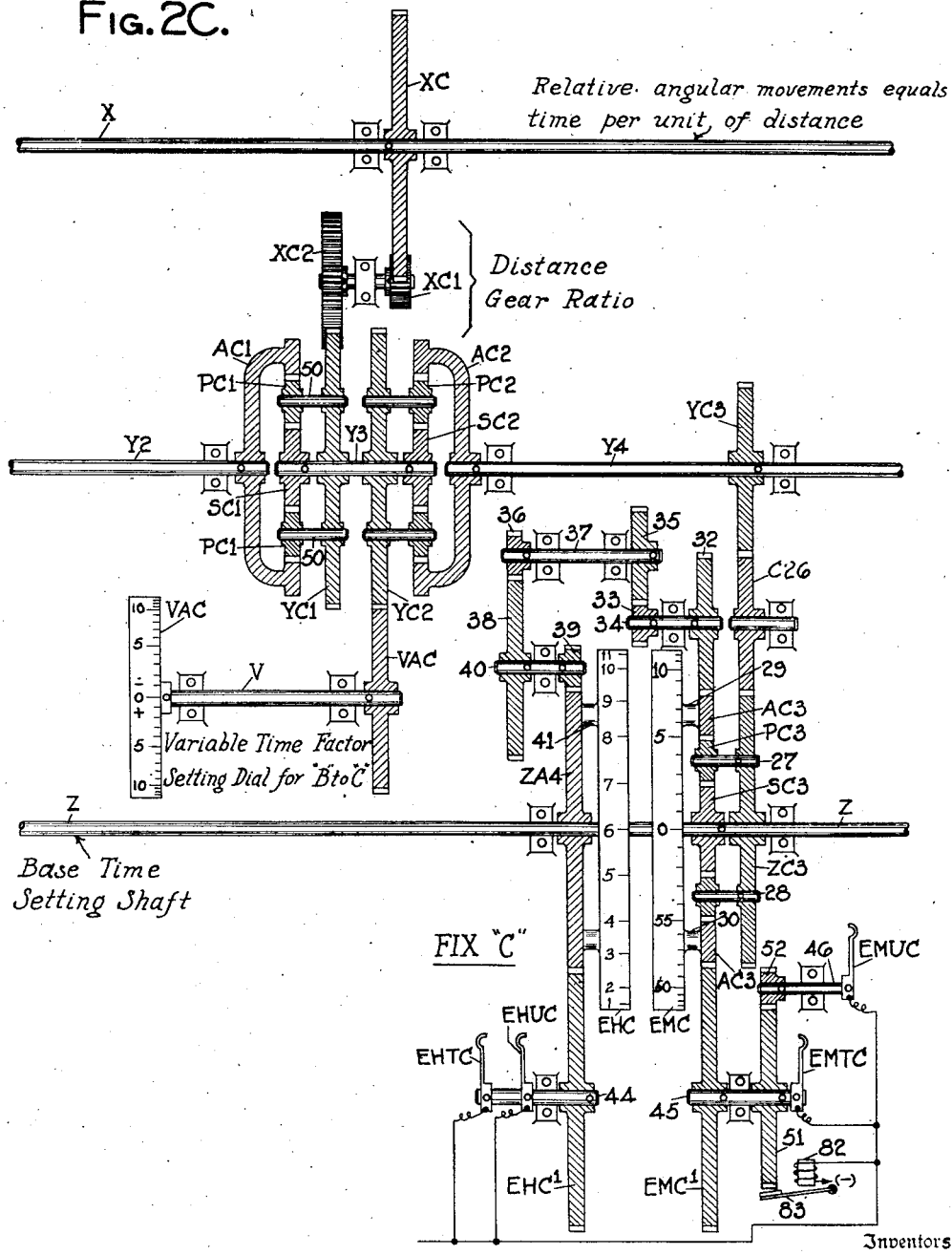

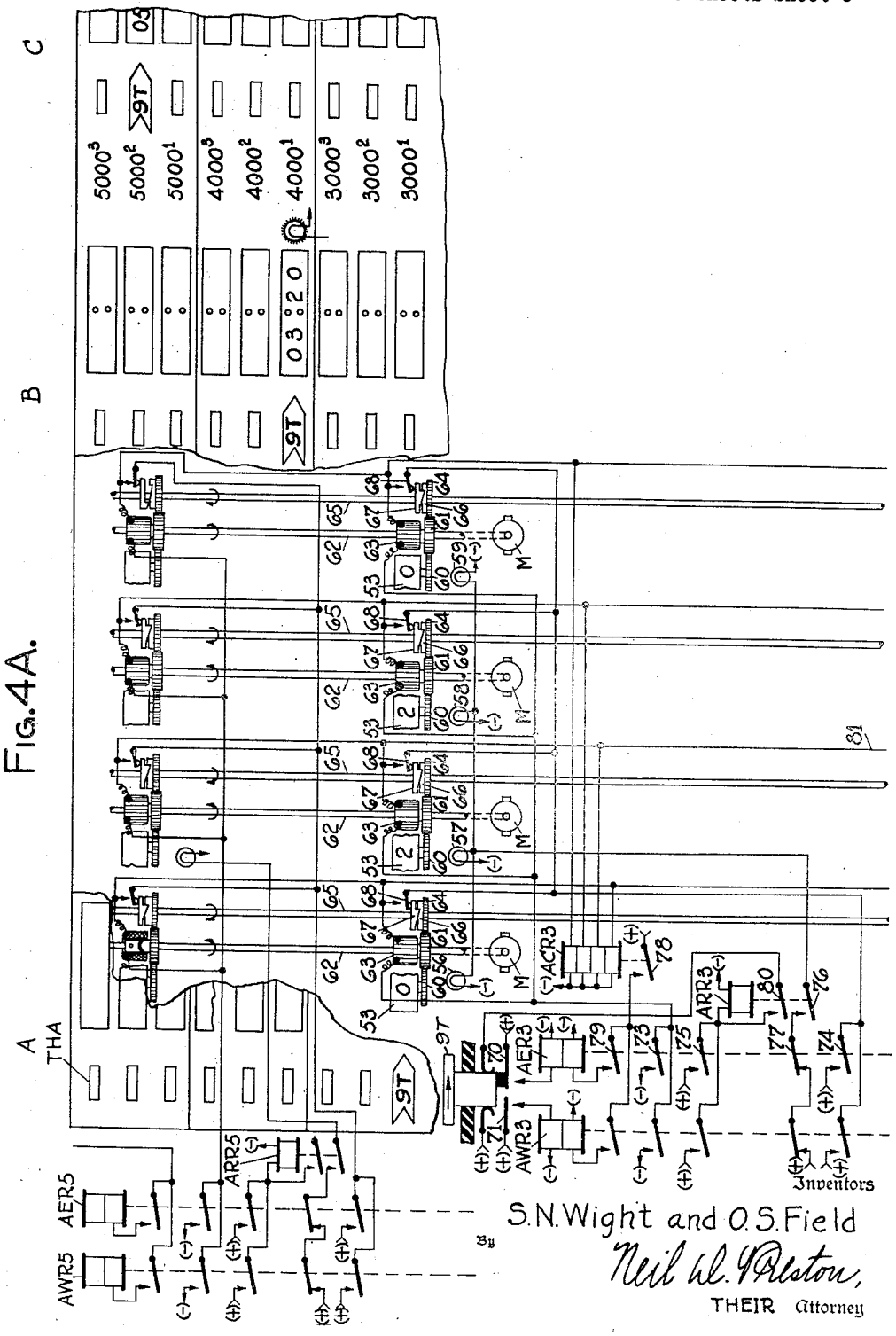

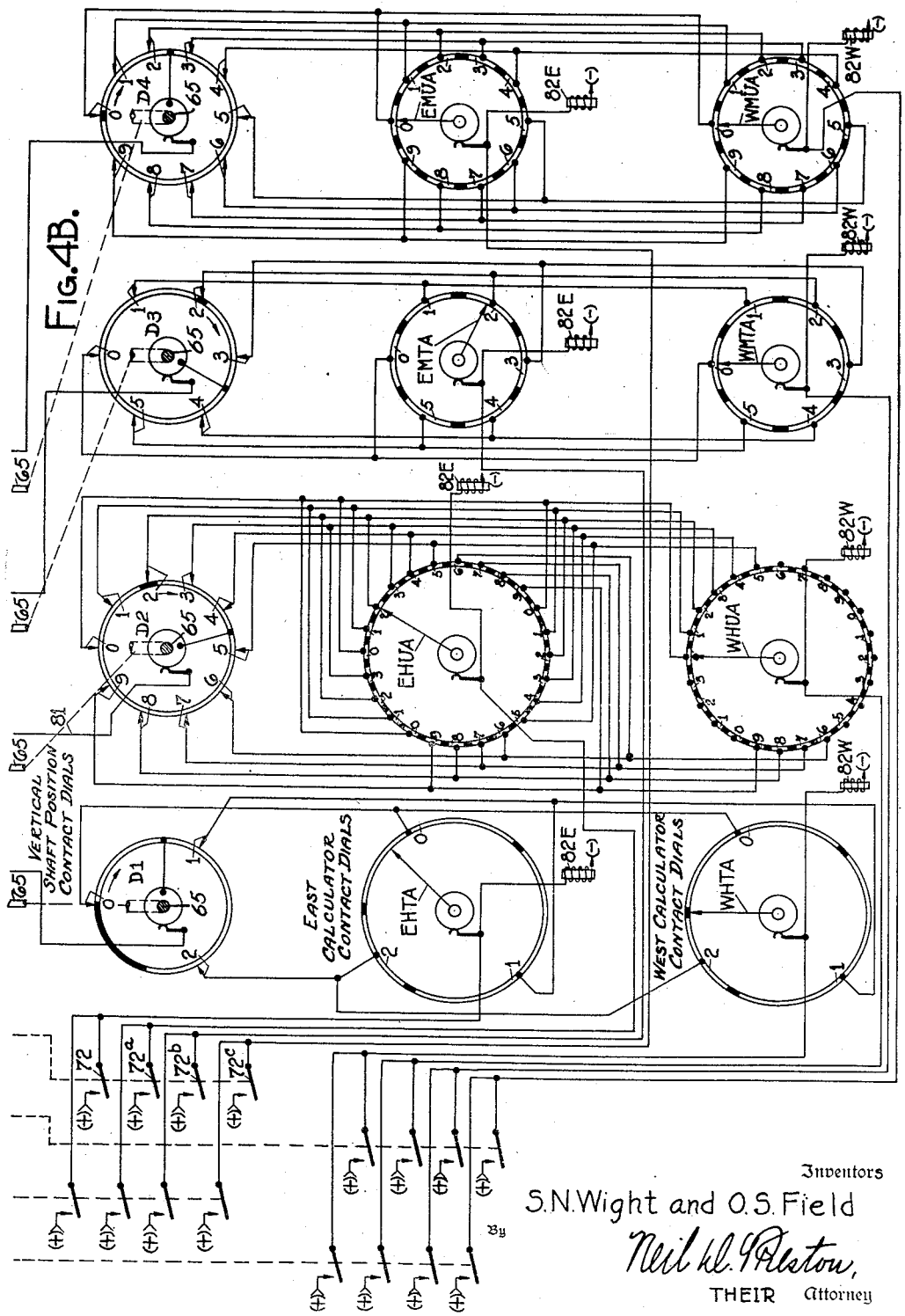

Jan. 18, 1949.  S. N. WIGHT ET AL  2,459,399
AIRWAYS TRAFFIC CONTROL SYSTEM
Filed Dec. 24, 1942  9 Sheets-Sheet 8
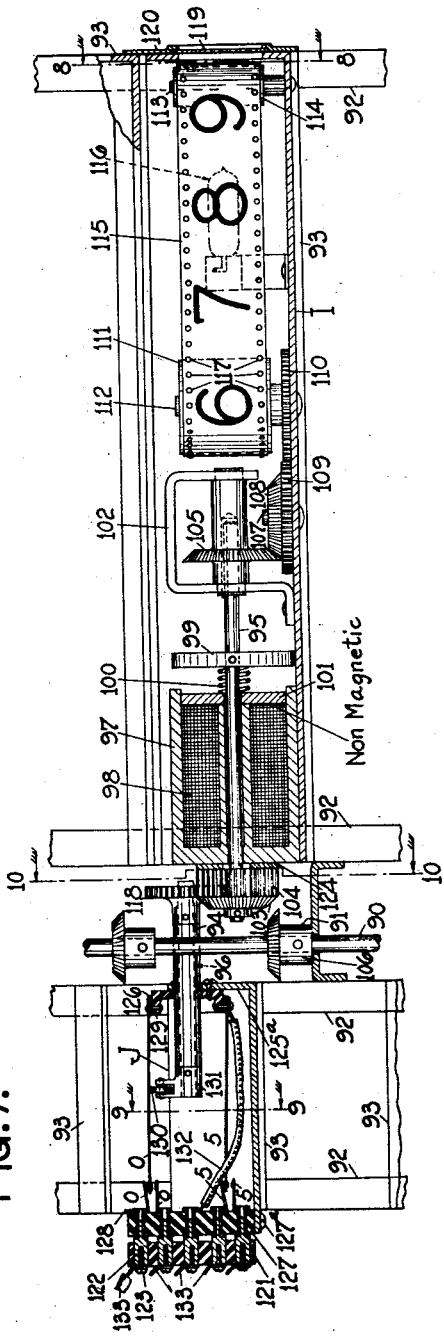
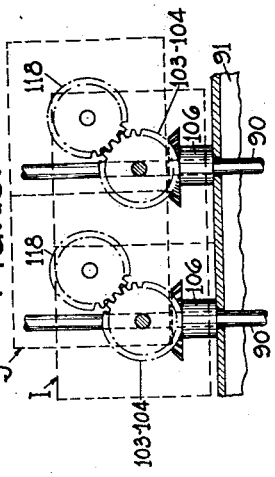
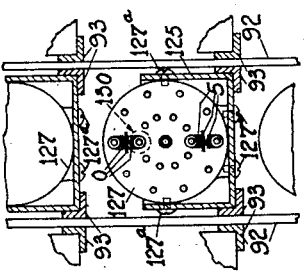
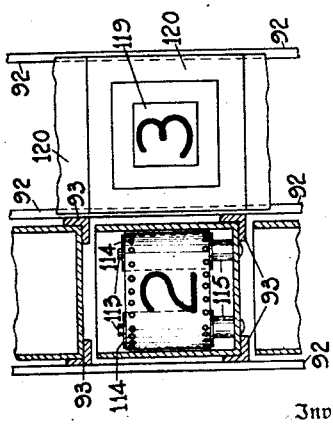
Inventors
S. N. Wight and O. S. Field
Neil W. Preston
THEIR Attorney

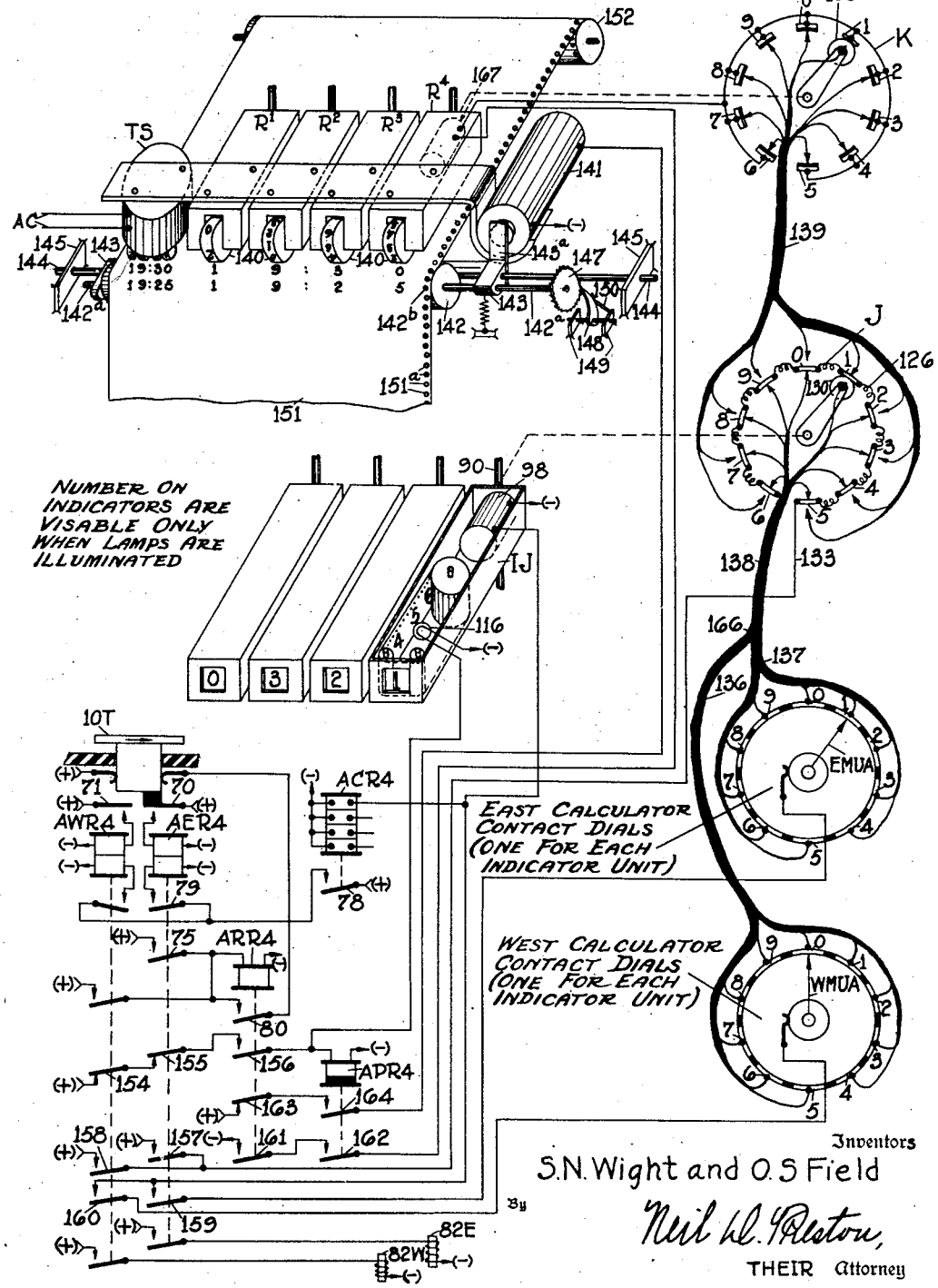

Patented Jan. 18, 1949

2,459,399

UNITED STATES PATENT OFFICE 2,459,399

AIRWAYS TRAFFIC CONTROL SYSTEM

Sedgwick N. Wight and Oscar S. Field, Rochester, N. Y., assignors to General Railway Signal Company, Rochester, N. Y.

Application December 24, 1942, Serial No. 470,018

34 Claims. (Cl. 235—61)

1

The present invention relates to airplane dispatching and more particularly to apparatus for displaying on a panel board authorized plane flights at various altitudes over a geographic route (route on the ground) and for displaying at each check point and station the arrival time for the plane.

It is essential that a dispatcher be properly informed as to arrival times of airplanes at various locations and altitudes to avoid the simultaneous arrival of a plurality of planes at the same station or check point and traveling at the same altitude to thereby avoid the possibility of a collision. In view of the high speeds at which airplanes fly it is not only necessary to calculate the arrival times very quickly and accurately but it is also essential that they be displayed as quickly as possible. These various stations or check points are commonly termed "fixes" in the parlance of air navigators.

In view of the above and other important considerations, it is proposed in accordance with the present invention to construct a calculator for each geographic route to calculate the arrival times at a plurality of successive fixes or check points if the starting or base time at the starting station and the speed of the plane between each pair of adjacent check points or fixes is known. Since each of the distances between such adjacent check points or fixes remains fixed and is known, such distance factors are preferably built into the calculating machine itself.

It is further proposed to provide means for making variable factor corrections individual to each stretch between adjacent check points and to have these corrections integrated into arrival times for all subsequent check points on the route.

It is further proposed to employ arrival time indicators on a panel or flight progress board for the various altitudes at each fix or check point and provide apparatus for either manually displaying the calculated arrival times or semi-automatically setting arrival time indicators signifying a particular plane flight or route in accordance with the time calculated on such calculator when a particular route and the direction of plane travel thereover is known.

It is further proposed in accordance with the present invention to provide automatically operated recording means to record on a record sheet each complete indication that was actually displayed on the panel or flight progress board.

Other objects, purposes and characteristic features of the invention will in part be pointed out

2 hereinafter in the specification and will in part be obvious from the accompanying drawings in which:

Fig. 1 shows the control and flight progress display board on which the apparatus of the invention is mounted;

Figs. 2A, 2B and 2C illustrate the units for the first three stations or fixes of an eastward route arrival time calculator;

Fig. 3 is an isometric exploded view of the apparatus and gearing for the unit for station B shown in Fig. 2B of the drawings;

Figs. 4A and 4B illustrate the circuits and associated apparatus for transferring the arrival times indicated on the calculator shown in Fig. 2 to the arrival time indicators shown in Fig. 1;

Fig. 6 shows a modified indicating board on which the starting and arrival times are written in by hand;

Figure 5:
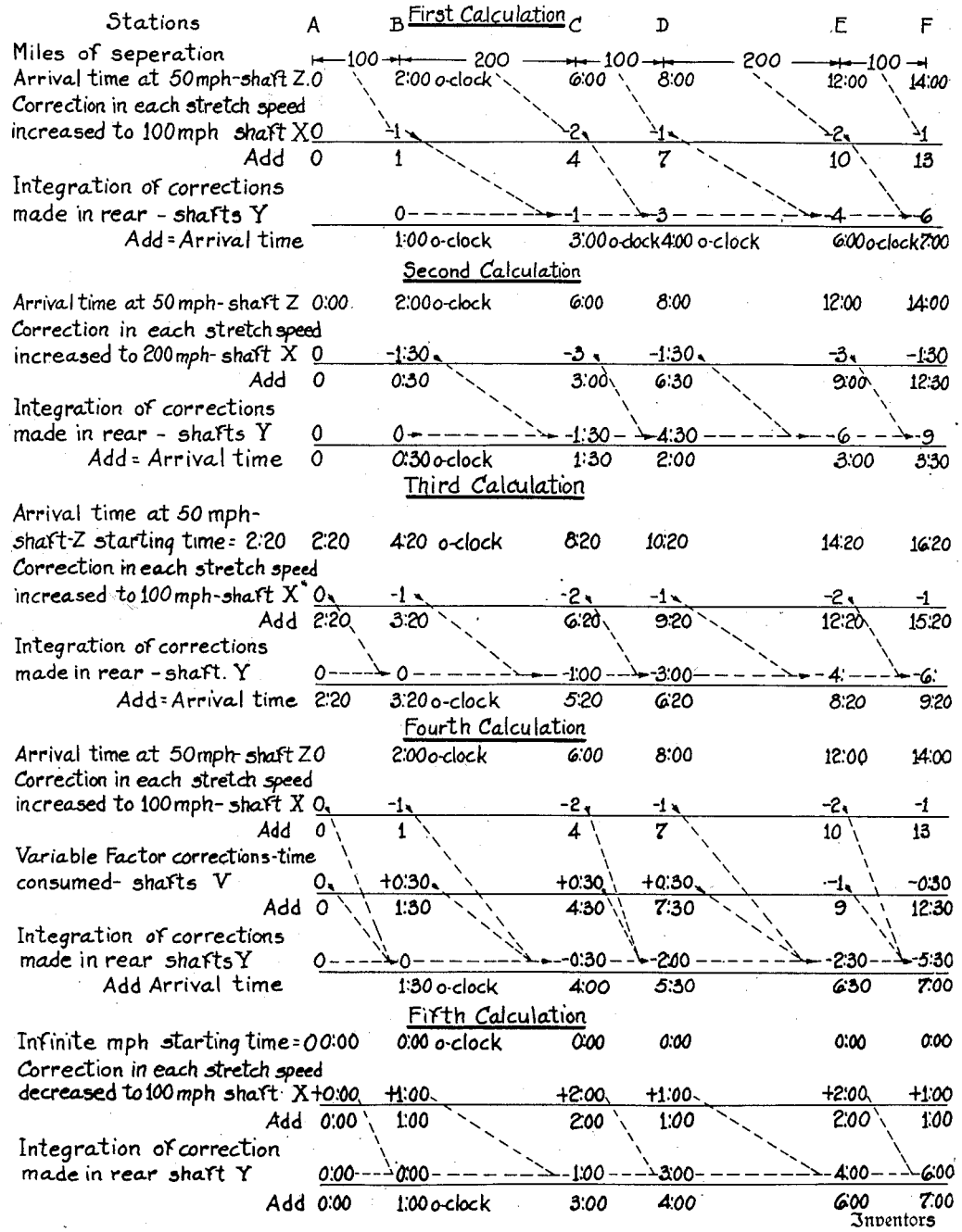
Fig. 5 shows tables to illustrate how the various shafts of Fig. 2 add the various positive and negative time increments to indicate arrival times at the various check points and stations.

Figs. 7, 8, 9 and 10 illustrate a modified form of starting and arrival time indicator operable from contacts of the calculator illustrated in Figs. 2 and 3; Figs. 8, 9 and 10 being sectional elevations taken on the dot-and-dash lines 8—8, 9—9 and 10—10, respectively, of Fig. 7 as viewed in the directions of the arrows;

Fig. 11 illustrates a recorder and a circuit structure for controlling the indicator shown in Figs. 7, 8, 9 and 10 by the calculator shown in Figs. 2 and 3 and for recording the indication displayed on this indicator; and Fig. 12 indicates the relative time quantities associated with the calibrations of the cruising speed dial EC shown in Fig. 2B.

*Control and indicating desk.*—The control and indicating desk upon which the present invention is superimposed is shown in Fig. 1 of the drawings where a desk constituting an inclined plane DESK has mounted thereunder an east calculator for calculating arrival times for eastwardly moving airplanes and a west calculator for calculating the arrival time of westbound airplanes. Although the inter-connected gears of the calculators are mounted under the desk the control knobs and indicating wheels project through the desk and are visible above the desk. The eastbound calculator is shown in the upper half of the desk whereas the westbound calculator is shown in the lower half of this desk. This eastbound arrival time calculator is shown structurally and more specifically in Figs. 2 and 3 of the drawings whereas the westbound calculator has not been shown in detail but is of exactly the same construction as is the eastbound calculator except that its starting or base time setting dials are at the right-hand end and integration is made toward the left whereas the starting or base setting dials for the east calculator are at the left-hand end and integration is made toward the right. Each of these calculators, as will be more fully pointed out hereinafter, is constructed to provide gear ratios and gear relationships so as to take into consideration during its calculation of arrival time the distance between adjacent stations or check points. Although the eastbound calculator will be more fully described hereinafter it may be pointed out that it includes a cruising speed knob EC, variable time factor control knobs EVAB, EVBC and EVCD, and combined hour and minute control knob and indicators EHA, EMA; EHB, EMB; EHC, EMC; and EHD. The cruising speed knob is provided with a latch or lock ELC whereas the variable time factor knobs EVAB, EVBC and EVCD are provided with latches ELAB, ELBC and ELCD, respectively. The indicating and control knobs and latches for the west calculator shown on the lower half of the plane of the desk DESK have been designated by letter reference characters which are the same as those for the eastbound calculator except that the letter W has been substituted for the letter E in each reference character.

To the back and above the control desk is provided a flight progress board or panel board PL which illustrates panels signifying altitudes of 3000, 4000, 5000 and 6000 feet respectively over a geographic air route and shows three separate tiers, layers or shelves for signifying three different planes flying over the same altitude over the same geographic route portion, these tiers having been designated by the number of the altitude and an associated exponent 1, 2 or 3, as the case may be. The geographic air route illustrated in Fig. 1 extends over fixes or check points A, B, C and D respectively and for each tier in each altitude there has been illustrated an indicator or number box IA for each fix or check point. Adjacent each one of these indications IA, IB, IC, etc., there is provided a token receptacle THA, THB, THC, etc. respectively. As shown in Fig. 6 these indicators may constitute pieces of slate or frosted glass upon which the arrival times may be manually inscribed by chalk or by pencil for those systems in which the transfer from the arrival time calculator to the indicating panel is made by hand. In Fig. 1 of the drawings, however, the indicators IA constitute rotary drums of Fig. 4 or belts of Fig. 11 on which numerals are inscribed so that any time from zero to twenty-four hours with the intervening minutes from 1 to 60 between successive hours may be indicated by the rotation of these drums. These drums are preferably electrically controlled as more specifically illustrated in Figs. 4 and 7 of the drawings.

As shown in Fig. 1 of the drawings one particular flight has been indicated on the panel board PL which for convenience is considered to be flight 9 as represented by tokens 9T. This particular airplane flight set up on the panel board of Fig. 1 extends from altitude 3000 to 4000 between the fixes or check points A and B and extends from altitude 4000 to 5000 in its flight from fixes or check points from B to C and ascends to altitude 6000 at fix D. It should be noted that a particular flight is not necessarily displayed in the same tier of the various altitudes. For instance, flight 9 is displayed in the first tier at locations A and B and in the second tier at locations C and D. This is done to allow for considerable flexibility and larger capacity.

As is more particularly pointed out hereinafter if the starting or base time at fix A is set on the hour and minute knobs EHA and EMA with the cruising speed knob EC set at the proper cruising speed, the other hour and minute knobs EHB—EMB and EHC—EMC, etc., will all be turned to assume positions to indicate the arrival times at these more remote fixes for a plane flying at the prescribed cruising speed. As illustrated on the panel board PL of Fig. 1 the starting time at stack A is 2:20 and if this starting time is 2:20 and the cruising speed is 100 M. P. H. the arrival times for stations B and C are 3:20 and 5:20 respectively on the assumption that the distance between stations A and B is 100 miles and the distance between stations B and C is 200 miles. The manner in which the shafts Z, X and Y calculate this arrival time is indicated by a tabulated analysis in Fig. 5 (third calculation) of the drawings.

*Arrival time calculator.*—Referring to Figs. 2A, 2B and 2C of the drawings, which when laid side by side in that order constitute a three station or fix calculator, the cruising speed knob EC has been shown in the upper left-hand corner of Fig. 2B in substantially the same way as it has been illustrated in the upper left-hand corner of the desk DESK of Fig. 1. This cruising speed knob EC is normally held in its last operated position by a latch ELC whereas the variable factor control knobs EVAB, EVBC and EVCD are provided with similar holding latches ELAB, ELBC and ELCD. A similar latch or lock is also provided for each of these knobs of the westbound calculator shown in the lower portion of the desk DESK of Fig. 1 which are designated by the same letter reference characters except that the letter E has been replaced by the letter W. This cruising speed knob EC is secured to the shaft X, which shaft extends throughout the entire length of the east calculator as shown in part in Figs. 2A, 2B and 2C of the drawings. This shaft X therefore moves a given angular distance for a corresponding change in the angular position of the cruising speed knob EC, and a particular angular movement of the shaft X represents a unit of time per unit of distance, as will be discussed more in detail with reference to Fig. 12. This function of the shaft X has been indicated by a suitable legend applied to Fig. 2C.

Near the lower part of Fig. 2 of the drawings has been illustrated a shaft Z upon which the various hour indicating wheels H and minute indicating wheels M are pivotally mounted, this shaft also extends the entire length of the calculating machine and has secured thereto, as by a cross-pin, a sun-gear S at each of the various locations. These sun-gears have been designated SA3, SB3 and SC3 for the three locations or fixes A, B and C illustrated in Fig. 2. This shaft Z acts through the sun-gears just mentioned so that the setting of a starting or base time at the fix A will cause the proper positioning of the time dials at each of the successive fixes; and similarly, if the time dials at fix B for example are set in accordance with a base time, then the time dials at the fix C and remaining fixes of the route (not shown) are properly set in accordance with such base time.

It should be understood that although the calculating machine for eastbound traffic has only been illustrated as of a length to take care of three stations that like units as those illustrated in Fig. 2B and Fig. 2C may be added to the right-hand end of the drawings of Figs. 2A, 2B and 2C to any extent within reasonable limits, and that in each case the gears will be exactly the same except for the gear ratios for the gears between shafts X and Y. The gear ratio in each case is selected in accordance with the distance between the pair of fixes with which it is associated. Between the shafts X and Z in Figs. 2B and 2C of the drawings have been illustrated the shafts Y, that is, a sectionalized shaft which consists of sections Y0, Y1, Y2, Y3 and Y4. The sections Y0 and Y2 are connected together by two planetary differential or epicyclic gearings including the shaft Y1, and similarly the shaft sections Y2 and Y4 are connected together by two identical differential planetary gearings including the shaft Y3.

Each of the epicyclic gearings connecting the adjoining sections of the time transfer shaft Y for a particular fix interval between two adjoining fixes permits the insertion of time both from the shaft X and the variable time factor shaft V associated with that fix interval.

In order to get a more clear understanding of the gearing mechanism shown in each of Figs. 2B and 2C, and shown in part in Fig. 2A, it is believed desirable to make reference to Fig. 3 wherein the gearing of Fig. 2B has been shown in an exploded isometric view.

Referring to Fig. 3 of the drawings the shaft Z is pinned or otherwise fastened to the sun-gear SB3 as well as the sun-gears SA3 and SC3 (see Figs. 2A and 2C) and other more remote sun-gears. On this shaft Z at station B and adjacent the sun-gear SB3 is pivotally supported a gear ZB3 which meshes with the intermediate gear B26 which intermediate gear in turn meshes with the gear YB3 pinned or otherwise secured to shaft Y2. The gear ZB3 is provided with studs or bearing pins 27 and 28 on which are pivotally supported planet gears PB3. These planet gears are in practice of substantially half the diameter of that of the sun-gear SB3 about which they rotate in meshed engagement. Just to the left of this sun-gear SB3 and pivotally mounted on the shaft Z are mounted two combined indicating and operating wheels or knobs, one of which, namely, the hour wheel, is designated EHB and has hour numerals from 1 to 24 ingraved thereon and spaced equally, whereas the other, or minute wheel, EMB has engraved thereon minute marks from 1 to 60 of which each fifth mark is identified by its minute numeral. These minute numerals are in the order 5, 10, 15, etc. As just pointed out this hour and minute wheel is each pivotally secured on the shaft Z and these hour and minute wheels will each be operated by the planet gears PB3 in a manner as will presently be pointed out. To the minute wheel EMB is fixedly secured, as by studs 29 and 30, an annular gear AB3 which has an internal pitch diameter of substantially twice that of the pitch diameter of the sun-gear SB3 and is provided with annular teeth engaging the teeth of the two planet gears PB3, which planet gears in turn have their teeth also engage the teeth of the sun-gears SB3. Since the sun-gear SB3 is of substantially half the diameter as that of the annular gear AB3 the rotation of the shaft Z to an extent of 180 degrees, it being assumed that the gear ZB3 is held stationary, will cause the annular gear AB3 to rotate through an angle of substantially 90°. This relationship between the pitch diameter of these gears, although not absolutely necessary, is desirable and this relationship should be kept in mind in the study of this disclosure. Conversely, if the gear ZB3 is held at rest, as it normally will be through the medium of the various latches or locks L (see latches ELC, ELAB, ELBC, etc., of Fig. 1), rotation of the minute wheel EMB through an arc of 90° will cause rotation of the shaft Z through an arc of 180°. The hour wheel EHB is similarly fixedly connected to a gear ZB4 by studs 41 and 42.

The annular gear AB3 is not only provided with teeth in its annular race but is also provided with gear teeth on its perimeter which latter gear teeth together with other gears maintain the proper relationship between the hour wheel EHB and the minute wheel EMB. That is the external teeth of annular gear AB3 mesh with the gear 42 connected to the pinion 33 by a shaft 34, which pinion 33 in turn meshes with the gear 35 connected to pinion 36 by a shaft 37, which pinion 36 in turn meshes with a gear 38 connected to pinion 39 by a shaft 40, which pinion 39 meshes with a gear ZB4 directly fastened to the hour wheel or hour drum EHB as by studs 41 and 42. This train of gears 32, 33, 35, 36, 38 and 39 affords a gear reduction of 24 to 1. In other words, rotation of the minute wheel EMB through one complete revolution causes one twenty-fourth of a complete rotation of the hour wheel EHB. In other words, the rotation of the minute wheel EMB through one complete revolution moves the hour wheel from one hour number to its next adjacent hour number. It should be understood that this gear reduction may, if desired, be of the intermittent type whereby the entire movement of the hour wheel from one number to the next higher one takes place during the movement of the minute wheel from the 55 to the 60 position.

From the foregoing it should now be understood that, if the gear ZB3 is held stationary, as it normally is, the rotation of the minute wheel EMB through one complete revolution will cause the hour wheel EHB to rotate in the same direction through $\frac{1}{24}$ of one revolution and will cause the shaft Z to rotate through two complete revolutions. Also, that if the next gear ZC3 is held stationary such two complete revolutions of shaft Z will cause the minute wheel EMC to make a complete revolution in the same direction. The gear ZB4 which is directly connected to the hour wheel EHB directly drives a gear EHB[1] of the same diameter as the gear ZB4, and, and this gear EHB[1] is directly fastened to two contact brushes EHTB and EHUB through the medium of shaft 44. These contact brushes EHTB and EHUB are more clearly shown in Fig. 4B of the drawing (see contact arms EHTA and EHUA).

In a similar manner the annular gear AB3 drives a gear EMB[1] of the same diameter as the exterior diameter of the annular gear AB3 and this gear EMB[1] through the medium of shaft 45 drives a gear 51 having secured thereto a contact brush EMTB, also more fully shown for station A in Fig. 4B of the drawings where this contact arm is designated EMTA. This gear 51 directly meshes with a pinion 52 which has a pitch diameter substantially $\frac{1}{6}$ of the pitch diameter of gear 51 so that the pinion 52 makes six revolutions for each revolution of the gear 51. This gear 52 through the medium of the shaft 46 drives the contact brush EMUB, which brush for station A is more clearly shown in Fig. 4B of the drawings and is there designated EMUA.

The gears associated with the shafts Y0, Y1, Y2, etc. (see Fig. 3) may for convenience be called the integration gears in that they accumulate, by the rotation of gear YB3 meshing with gear B26, the sum or difference of the rotation of the cruising speed knob EC and the variable time factor knob VAB. As shown in Fig. 3 of the drawings the shaft Y0 is firmly locked against rotation by a pin 48¹ held in the fixed block 48 as a result of which the annular gear AB1 is at all times held stationary, this annular gear AB1 being secured to the shaft Y0 through the medium of a yoke 49. This section Y0 is the only portion of the entire shafts Y that is bolted against rotation. These shafts such as Y2, Y4, etc. may be properly termed time transfer shafts, since the time added or subtracted by the movement of shaft X or shaft V for each fix interval is transferred from the accumulator gearing associated with that fix interval to the accumulator gearing associated with the next fix interval. In this way, the flying time for each successive fix interval is added to the flying time of all other fix intervals in the route. For example, the flying time represented by the position of the gear YB1 is transferred to the accumulator gearing associated with the fix interval between fixes B and C and is added to the flying time represented by the position of the gear YC1 with the sum appearing on gear AC2. This operation will presently be explained in greater detail.

On the shaft Y1 is pivotally supported a gear YB1 which supports the pivot pins 50 for supporting the planetary pinions PB1, so as to hold these planet pinions PB1 securely in meshed relation with the teeth of the gear AB1. These planet pinions PB1 are also held in meshed engagement with the teeth of the sun-gear SB1. The planet pinions PB1 are preferably of substantially half the diameter as that of the sun-gear SB1 and the sun-gear is preferably half the diameter of the annular gear AB1. It is thus seen that if the gear YB1 is rotated through a half revolution that the shaft Y1 will be rotated through one and one-half revolutions. Just to the right of the planetary differential reduction gearing just described and including gears YB1, SB1, PB1 and AB1 is provided a similar planetary differential reduction gearing including the gears YB2, AB2, SB2 and PB2 except that this latter planetary differential reduction gearing is turned the opposite way end for end from that of the one just described. This is done so that rotation of the shaft Y0, if it were possible to rotate this shaft, with the cruising speed knob EC and the variable time factor control knob VAB held stationary the shaft Y2 will rotate to the same extent that the shaft Y0 is rotated. This is unimportant for the apparatus at station B but is of importance for like apparatus located at station C shown in Fig. 2C of the drawings and for other more remote stations.

It is now apparent that the three planetary gear systems including gears AB1, SB1, PB1 and YB1; AB2, SB2, PB2 and YB2; and AB3, SB3, PB3 and ZB3 respectively all have the same gear ratios and for this reason it is believed helpful to submit the following gear ratio relationship of each of the three systems: If the planet pivot supporting gear is held stationary the angular speed ratio of annular gear to the sun-gear is 1 to 2; if the annular gear is held stationary the angular speed ratio of the planet pivot supporting gear to sun-gear is 1 to 3; and if the sun-gear is held stationary the angular speed ratio of planet pivot supporting gear to annular gear is 2 to 3. Obviously, if the direction of the drive in each case is reversed the angular speed ratio will be the reciprocal of that given.

If we now assume that the shaft Z is held stationary and the gear YB1 is rotated by the cruising knob EC it will be seen that this rotation of the gear YB1 causes the planet gears PB1 to revolve within the annular gear AB1 to cause rotation of the sun-gear SB1 at thrice the extent of the rotation of the gear YB1. This "thrice extent of rotation" of sun-gear SB1 is reflected in similar rotation of the sun-gear SB2 which, if it is assumed that the variable factor knob VAB is held in locked position, will cause the shaft Y2 to rotate to half the extent of rotation of the sun-gear SB2, so that the shaft Y2 rotates to an extent equal to one and one-half times that which the original gear YB1 was rotated. If on the other hand the variable factor knob VAB is turned to rotate the gear YB2 to a predetermined extent, under conditions with the cruising knob EC held in locked position, this rotation of the gear YB2 will cause the planet gears PB2 to perambulate about the stationary sun-gear SB2 to in turn cause the shaft Y2 to rotate three-halves the extent of rotation of the gear YB2. From the foregoing consideration it is apparent that rotation of the cruising speed knob EC or the variable time factor knob VAB or both will cause these two rotations to be accumulated into a sum of two or a difference of two rotations of the gear YB3 depending on whether the gears YB1 and YB2 were rotated in the same or different directions. It is also readily seen that if the shaft Z is held stationary the extent of rotation of the shaft Y2 will be reflected in similar rotation of the minute wheel EMB and in turn a corresponding but reduced rotation of the hour wheel EHB.

Referring now to Figs. 2A, 2B and 2C, arranged side by side, it will be observed that if the shaft Z is assumed to be held stationary, as for instance by holding it manually, the rotation of the cruising speed knob EC will cause rotation of the gear YB1 to an extent depending on the gear ratio imposed between the gear XB and YB1 by gears XB1 and XB2. It may be pointed out here that this gear ratio imposed by gears XB1 and XB2 is dependent upon the distance between stations or fixes A and B whereas the gear ratio imposed by the gears XC1 and XC2 (see Fig. 2C) is dependent upon the distance between stations B and C.

Referring to Figs. 2 and 3 the gear XB1 has a diameter three-fourths the diameter of gear XB2 so as to impose an angular speed ratio from gear XB1 to gear XB2 of 3 to 4. As already pointed out the planet gears are half the diameter of the sun-gears and the sun-gears are half the diameter of the annular gears. Therefore, if the cruising speed knob EC is turned a one-half revolution, and bearing in mind that gears XB and YB1 are the same in diameter, the gear YB1 is turned two-thirds of one revolution, which turns the shaft Y1 two revolutions (the annulus AB1 being bolted stationary), which turns shaft Y2 one revolution, which turns gear ZB3 two-thirds of one revolution (gear YB3 having a diameter two-thirds of that of gear ZB3) which results in the turning of minute wheel EMB one revolution. In other words, $\frac{1}{2} \times \frac{4}{3} \times 3 \times \frac{1}{2} \times \frac{2}{3} \times \frac{3}{2} = 1$. This ratio is as it should be in that if the cruising speed is changed by rotating cruising knob from the 50

M. P. H. position to the 100 M. P. H. position (one-half revolution) the minute wheel should be moved backwards one revolution because one hour is saved in increasing the speed from 50 M. P. H. to 100 M. P. H. over a 100 mile stretch, the assumed distance between stations A and B. This one hour movement backwards of the minute wheel for station B is shown by the figure −1 in the second line of numerals column two of Fig. 5 (see first calculation).

Similarly, if the cruising speed knob EC is moved from the 100 M. P. H. position to the 200 M. P. H. position, the minute wheel EMB should be moved backward 30 minutes more, and for this reason the 200 M. P. H. position of the cruising speed knob EC is only 90 degrees beyond the 100 M. P. H. position as shown in Fig. 2B. In other words, each speed calibration point on the cruising knob EC which doubles the preceding speed calibration point is only separated from said preceding calibration point by a distance equal to one-half the distance between such preceding calibration point and the speed calibration point which it doubles. This type of calibration of speed in miles per hour on the cruising speed knob EC is in effect a calibration of its reciprocal in hours per mile (more easily expressed of as minutes per mile) giving a uniform time scale, that is, each degree of rotation of the shaft X represents the same time quantity. This can be seen by referring to Fig. 12 where the cruising speed dial EC as shown in Fig. 2B is reproduced with the time units in minutes for the various speeds of the dial indicated around the outside of the dial. From this Fig. 12 it can be seen that the time units between the 50 M. P. H. and 100 M. P. H. positions is six tenths of a minute, while the time units between 100 M. P. H. and 200 M. P. H. positions is three tenths of a minute, or one-half as many tenth minutes as between the 50 and 100 M. P. H. positions. When the cruising speed dial EC is moved from one speed calibration to another, the shaft X is moved through a number of angular degrees representing a number of time units which are in effect multiplied by the distances between pairs of fixes by the distance ratio gears, such as gears XB1 and XB2. This causes the gear YB1 for example to assume a position in accordance with the flying time between fix A and fix B for a proposed flight traveling at the specified speed indicated by the setting of the cruising speed knob EC. Similarly, the gears XC1 and XC2 causes the gear YC1 to assume a position in accordance with the flying time of the proposed flight between fixes B and C. The movement of gear YB1 is added to the gear AB2 and shaft Y2 which through gear YB3 governs the time dials EHB and EMB. The shaft Y2 is also a time transfer shaft and acts to transfer the time setting of the gear AB2 to the accumulator gearing associated with the fix interval B to C so that the time setting of the gear AB2 is added to the time setting of the gear YC1 to give the arrival time for the proposed flight at the fix C on gear AC2 which governs the time dials EHC and EMC.

Referring now to Fig. 2C of the drawings and bearing in mind that the distance from station B to station C is twice that of the distance from station A to station B and that for this reason the minute wheel EMC must be turned backwards two revolutions by the shaft X to reflect the two hours time saved as the plane speed or cruising speed is changed from 50 M. P. H. to 100 M. P. H. in flying over the 200 mile stretch. In other words, the gears XC1 and XC2 must have diameter ratios 3 to 8 instead of 3 to 4 and this is the case, as shown in the drawing. Let us now see how turning of the cruising speed knob EC produces progressive turning of minute wheel EMC over two different channels. Rotation of cruising knob EC a one-half revolution toward the left as shown by the arrow in Fig. 3 (to the right as shown in Fig. 2B) causes gear XB to be rotated one-half revolution to the left, which causes the gear YC1 (see Fig. 2C) to be rotated four-thirds of a revolution toward the left, which causes shaft Y3 to be rotated four revolutions, which causes shaft Y4 to be rotated two revolutions, which causes gear ZC3 to be rotated four-thirds or one and one-third revolutions (assuming shaft Y2 to be stationary) which causes annular gear AC2 and minute wheel EMC to be rotated four-thirds times three-halves or two revolutions. This correction by turning minute wheel EMC backwards is shown by the numeral −2 in the second line of numerals column three of Fig. 5 of the drawings (first calculation).

This is however not all of the backward rotation that is imposed on minute wheel EMC because the shaft Y2 was not actually stationary as above assumed and the time saved by increasing the cruising speed from 50 M. P. H. to 100 M. P. H. between stations A and B must also be taken into consideration in determining the arrival time at station C. That is, under the conditions assumed the plane leaves the station B one hour earlier in flying toward station C than it would have when flying at a cruising speed of 50 M. P. H. This additional correction of the minute and hour wheels for station C is effected by the rotation of shaft Y2 which was above assumed to be stationary. In other words, during the above consideration when gear YC1 was rotated toward the left (see gear YB1 of Fig. 3) through four-thirds of one revolution the annulus AC1 was also rotated toward the right (as annulus AB1 is viewed in Fig. 3) one revolution so that these two rotations produce additive or accumulation of rotation of the shaft Y4. Summarizing if annulus AC1 is rotated one revolution in one direction and gear YC1 was rotated in the opposite direction four-thirds of one revolution then shaft Y3 was rotated 6 (two times one plus three times four-thirds is six) revolutions in said other direction. Rotation of shaft Y3 through 6 revolutions causes shaft Y4 to rotate three revolutions (gear YC2 being held stationary), and three revolutions of shaft Y4 causes two revolutions of gear ZC3 (gear YC3 being two-thirds the diameter of ZC3), which through planet gears PC3 causes a fifty per cent step-up in rotation of minute wheel EMC causing it to rotate three revolutions backward. This −3 hours correction is indicated in the table of Fig. 5 (first calculation) fourth line of numerals column three. In other words, the shafts Y2, Y4 and Y6 (not shown) carry over or integrate the correction made at a next preceding station in the time reading to a station under consideration, and the time reading at such next preceding station already included the correction made at the next preceding station thereto. Such carry-over is not only as to the corrections made by the cruising knob EC but also as to corrections made by any one or more of the variable factor correction knobs for any of the stretches to the rear of a station under consideration, as for instance the time correction made by the correcting knob VAB for the stretch from station A to station B is carried over into the arrival time indication given for station C.

*Variable factor correction.*—Even though the air speed (speed in the air) of a level flying plane may be definitely known this does not mean that this is the ground speed (speed over the ground) in that the medium supporting the plane (air) may be moving in any one or numerous directions. If the plane is travelling against the wind the ground speed will be the difference between the air speed and the velocity of the wind. If it is travelling with the wind the ground speed will be the sum of these speeds. If the wind is at right angles to the direction of flight the air mile distance will be longer because the plane must fly the diagonal of a rectangle constructed in the moving air from the two speeds and therefore the plane will be delayed. Also if a plane makes an altitude climb it will be somewhat delayed whereas if it makes a descent its ground speed will be higher. The dispatcher and his assistants will by making rough calculations of the known factors, such as, direction and velocity of the wind, the make of the plane, the pilot and the flight whether ascending, descending or flying horizontal, conclude whether the variable factor correction shall be plus minutes or minus minutes and of what value. In order to inject this variable factor correction into the arrival time indications the variable factor knobs, one for each stretch, such as VAB, VBC, etc., have been provided. Referring to Fig. 3 if the variable factors sum up to save time the knob VAB will be turned in the minus direction to the extent of the time expected to be saved in the stretch from A to B and if it is a loss of time it will be turned in the plus direction.

Let us assume that five minutes will be saved in moving from station A to station B. The dispatcher will move the knob VAB to the −5 minute position by turning the knob 30 degrees from its zero position. Rotation of the knob VAB through $\frac{1}{12}$ of a revolution, in the direction of the arrow shown in Fig. 3, causes gear VAB$^1$ to be turned to the same extent and in turn causes the gear YB2 to be turned $\frac{1}{12}$ times $\frac{2}{3}$ or $\frac{1}{18}$ of a revolution toward the right, which turns shaft Y2 $\frac{1}{18}$ times $\frac{3}{2}$ or $\frac{1}{12}$ revolution toward the right (sun-gear SB2 being assumed to be stationary) which turns gear ZB3 $\frac{1}{12}$ times $\frac{2}{3} = \frac{2}{36}$ or $\frac{1}{18}$ revolution toward the right which turns minute wheel EMB $\frac{1}{18}$ times $\frac{3}{2} = \frac{3}{36}$ or $\frac{1}{12}$ revolution toward the right namely from the 60 minute position to the 55 minute position. Had the variable factor reduced the plane speed more time would have been required and the variable time factor knob VAB would have been turned in the plus or counter-clockwise direction as viewed from the left. Not only was this five minute turning of knob VAB effective in turning the minute wheel EMB backwards to the extent of 5 minutes but it was also effective, through the medium of shaft Y2 and the gears for station C, to turn the minute wheel EMC backwards $\frac{1}{12}$ of a revolution for reasons already described. As is apparent from Fig. 2B of the drawings the scale on the cruising speed knob EC is reciprocal in nature in the sense that the speed graduations are unequally spaced so as to turn the shaft a varying number of degrees for each different increment of speed. Obviously if a uniform speed scale on the cruising speed knob EC is desired a variable ratio reduction cam may be inserted between the cruising knob and the shaft X.

*Operation of arrival time calculator.*—Let us now refer to Figs. 2 and 3 for illustrations of the calculator and to Fig. 5 calculations first to fifth, inclusive, illustrating five different calculations performed by the calculator. Referring to Fig. 5 it will be observed that at the extreme left of this figure an explanation is made for the various items in each of the tables given. In the first calculation of Fig. 5, line 1 designates the stations A to F inclusive. Line 2 designates the miles of separation between stations which for convenience are alternately 100 and 200 miles. Line 3 shows the time of plane arrival for a speed of 50 M. P. H. as calculated through the medium of shaft Z and the planetary or epicyclic gearing mounted on this shaft Z. The next line shows the correction that is made, by turning the cruising shaft X from the 50 M. P. H. to the 100 M. P. H. position, insofar as the time saved in the next preceding stretch is concerned, the correction being made by shaft X. It should be understood that the cruising speed is read at the pointer 69 (Figs. 2B and 3). The sixth line shows the correction that is made by various sections of shaft Y and its associated gearing which integrates and injects into each arrival time indication the correction made at all preceding stations. In other words, if time is saved between stations A and B it not only results in a lower arrival time reading at station B but also results in a lower arrival time indication at each of the subsequent stations. By adding the correction made by shaft Y to the indications set up by shafts Z and X in combination the ultimate time of arrival indications are indicated in the last line of the Fig. 5, first calculation.

The various dotted lines and arrows shown in Fig. 5 of the drawings indicate the factors which are used in deriving the numerals added to the former time arrival indication. For instance, the −1 (minus one) shown in the second line of time numerals second column of Fig. 5, first calculation, indicates that one hour is saved in a 100 mile stretch by increasing the speed of the plane from 50 M. P. H. to 100 M. P. H., as is also true of the −2 indicated for station C, the distance from station B to station C being 200 miles. Referring now to the numeral −3 in the fourth line of time numerals fourth column, this value is derived from the −2 hours gained by the plane in increasing its speed from 50 to 100 M. P. H. in travelling from station B to station C to which is added the −1 hour time gained by increasing the speed from 50 to 100 M. P. H. in travelling from station A to station B. This three hour gain is however not the only gain in arrival time for station D because another hour time is saved by the plane increasing its speed from 50 miles to 100 M. P. H. over the stretch from station C to station D as indicated by the −1 in the second line of time numerals column four. By subtracting these gains of four hours from the originally calculated time of 8 o'clock will result in an indication indicating that the plane will arrive at station D at 4 o'clock. This is as it should be because irrespective of the distance between locations if the speed is doubled the time consumed should be halved.

The table showing the second calculation is identical to the table showing the first calculation except that the cruising speed of the plane has been increased from 50 M. P. H. to 200 M. P. H. It will be observed that since the starting time is zero in both cases the arrival times indicated in the second calculation are in each instance half as late as are the arrival times indicated in the first calculation.

Referring now to the third calculation it will be observed that the starting time at station A is not zero (24 o'clock) as is the case in the first calculation but instead is 2:20. It should also be noted that in this third tabulation the speed of the plane is presumed to have been increased from 50 M. P. H. to 100 M. P. H. the same as in the first calculation and that all the arrival times indicated in the third calculation are two hours and twenty minutes later than those indicated for the first calculation.

Referring now to the fourth calculation in Fig. 5 of the drawings it will be observed that the calculations here given also assume, like in the first calculation that the cruising speed of the plane has been increased from 50 M. P. H. to 100 M. P. H. and that the starting time for station A is zero in both cases. It should however be observed that in the fourth tabulation various factor corrections have been applied to each of the stretches from station A and station F, inclusive. The time lost from stations A to B, B to C and C to D, are assumed to be 30 minutes in each instance, whereas the time gained in flying from station D to station E is assumed to be one hour and the time gained in flying from station E to station F is assumed to be 30 minutes. This table constituting the fourth calculation analytically shows how these various correcting factors have been applied not only to the arrival time indication of the immediate station for the stretch but such correction is also made to the arrival times of all subsequent stations toward the right. It will be observed that the time lost in travelling the first three stretches has been regained in travelling the last two stretches and for this reason the arrival time at station F in the fourth tabulation should be the same as the arrival at station F in the first tabulation, and it will be observed that this is the case in these two tabulated analyses.

Thus far it has been assumed that the cruising speed knob EC shown in Figs. 2A and 3 normally assumes the 50 M. P. H. position and that it is advanced to a higher speed when a calculation is to be made. This is not necessarily true because if the cruising knob EC should be turned one full turn toward the right from the position shown in Fig. 2B, it would assume what might be called the infinite M. P. H. speed position. In practicing the invention, a stop is however preferably provided so that the cruising speed knob cannot be moved fully to the so-called infinite speed position. If this cruising knob EC is assumed to be moved one full turn to the right (Fig. 2B) and the hour and minute wheels for station A are moved to their zero position (24 o'clock position) then each of the indicators for stations B and C, as well as all subsequent indicators in the series, will assume their zero positions (see fifth calculation of Fig. 5), and if the hour and minute dials for station A are moved to any other indicating position the corresponding dials at subsequent stations will all indicate the same position. This is true because these various hour and minute dials or wheels are directly connected through a continuous shaft Z extending through all indicating mechanisms. If now the indicating dials EHA and EMA for station A are held in their zero position and the cruising knob EC is turned from the infinite position toward the left to the particular cruising speed which a plane is presumed to fly each of the indicating dials for the stations B, C, etc. will indicate the proper arrival time.

In tabulation five of Fig. 5 of the drawings has been indicated a tabulated analysis under the conditions of zero starting time with the cruising knob first assuming the infinite M. P. H. position, an absurdity, which is later corrected by moving this cruising speed knob EC to the 100 M. P. H. position. No further discussion of this Fig. 5 fifth calculation is believed necessary, except to direct attention to the fact that the ultimate arrival times of the first and fifth calculation of Fig. 5 are the same as they should be.

It is of course understood that if the cruising knob is moved after the starting time has been set for station A that the hour and minute wheels for station A must be held while the cruising knob EC is moved to its new position or else be corrected after the cruising knob is moved because turning of the cruising knob may change the starting time setting. In using the calculator illustrated in Figs. 2 and 3 it is assumed that the cruising knob and the various variable factor knobs are first moved to the proper position after which the starting time for station A is set by manually turning the hour and minute wheels for station A. It should be understood that if it is found that the airplane has gained or lost time in travelling from station A to station B, that the minute and hour dials for station B may then be moved to the proper new starting time for station B as a result of which the newly corrected arrival times for all subsequent stations C, etc., will be indicated. As pointed out more fully hereinafter the new arrival time settings may be transferred to the indicators on the panel board after each correction by merely depressing the proper token.

As already mentioned the indicating scale on the cruising knob is reciprocal in nature. This is true because the time saved, namely, the difference between two successive time readings, each time the speed is doubled is half as much as the time saved during the preceding doubling of the speed. In other words, if we assume speeds of 50, 100, 200 and 400 M. P. H. respectively it requires 2, 1, ½ and ¼ hours respectively for a plane to fly over a hundred mile stretch and the difference between these times are 1, ½ and ¼ respectively. Since doubling of the speed only saves half of the time required at the preceding speed it is readily seen that a scale which approaches infinity as a limit is involved.

*Transfer mechanism.*—As already pointed out the hour and minute wheels EHB and EMB of the east-bound calculator for station B (see Fig. 3) have associated therewith rotary contact arms EHTB, EHUB, EMTB and EMUB. Similar rotary contact arms EHTA, EHUA, EMTA and EMUA are provided for the eastbound calculator for station A and these latter arms have been shown in Fig. 4B of the drawings. In these reference characters the letters E and W signify "east" and "west," respectively; the letters H and M signify "hour" and "minute," respectively; and the letters T and U signify "tens" and "units" respectively. Also the letters A and B denote the particular station with which the apparatus is associated.

These contact arms electrically manifest the positions assumed or indications given by these hour and minute wheels EHA and EMA (Figs. 1 and 2A). These contact arms EHTB, etc. are so keyed or otherwise secured, to the hour and minute wheels that if a particular set of digit numbers are read on these hour and minute wheels EHA and EMA correspondingly numbered wires will be energized. For instance if these wheels EHA and EMA of Fig. 2A indicate 02 and 20 respectively, as assumed for the calculation given in the fifth table of Fig. 5 of the drawings, the wires 0 and 2 are energized by associated contact arms EHTA and EHUA, respectively, and the wires 2 and 0 are energized by contact arms EMTA and EMUA, respectively. Similar contact arms WHTA, WHUA, WMTA and WMUA are provided for the unit A of the westbound calculator shown in Fig. 1. These latter contact arms are shown in lower part of Fig. 4B of the drawings.

Referring now to Figs. 4A and 4B which when laid above each other show the apparatus and associated wiring for transferring the readings on one or the other of the two calculators (eastbound and westbound) shown in Fig. 1 to the indicators IA, etc., also shown in Fig. 1 by rotating each of these drums 53 of these indicators to the position where the proper numeral only is visible. These indicator drums 53 are hollow and are translucent with the numbers painted, or otherwise applied, to the inside of the drum so that the number is not visible from the outside unless the interior of the drum is illuminated. The lamps 56, 57, 58 and 59 (see Fig. 4A) have been provided to illuminate the four drums 53 of indicator IA for tier $3000^1$ at station A (see Figs. 1 and 4A). Although in practice the mechanisms for operating these four drums is mounted back of the indicating drums this indicator has for convenience been shown in exploded form in Fig. 4A of the drawings with the operating mechanism for the drums in each case shown to the right thereof.

Each of the four drums 53 of these indicators IA, etc. is pivoted about a vertical axis and is provided with a spur gear 60 at the bottom end of its vertical shaft. This spur gear 60 is in meshed relation with a gear 61 constituting one clutch member of a clutch, the other clutch member of this clutch being splined to the clutch shaft 62 so that upon energization of the coil 63 of this electro-magnetic clutch the gear 61 will rotate with the shaft 62 but upon deenergization of this coil the shaft 62 and gear 61 will be operatively disconnected from each other. In meshed engagement with the gear 61 is another gear 64 which is freely rotatable upon the contact drum shaft 65 but has integral therewith a synchronizing cam member 66 which if in synchronized relation with cam member 67 which is slidably splined to the shaft 65 will allow dropping of this cam member 67 to open contacts 68 and will also cause the contact drum shaft 65 to be rotated by the gears 61 and 64. As more clearly pointed out hereinafter if energy is applied to transfer an indication from a calculator contact mechanism to a particular indicating drum this drum will continue rotating, due to energization of its associated clutch, until (1) resynchronization of its associated cams 66 and 67 has taken place and thereafter (2) until the number drum 53 is in correspondence with the corresponding contact arm of the calculator. The clutch shaft 62 is driven by a motor M whereas the indicating shaft 65 is connected to its associated indicating contact drum D1, D2, D3 or D4 and drives the same.

Each token hole THA, etc. is provided with an east relay, such as, AER3 or AER5 and with a west relay, such as AWR3 or AWR5 and each of the pairs, such relays as AER3—AWR3 has associated therewith a repeater relay ARR3 and a clutch relay ACR3. The purpose of these relays will be more fully described hereinafter.

*Operation of transfer mechanism.*—Let us assume that the hour and minute wheels EHA and EMA respectively of the eastbound calculator indicate 2:20 o'clock which is the starting time as indicated for the calculation set up in the tabulated analysis, third calculation of Fig. 5. Under the assumed condition the four contact arms EHTA, EHUA, EMTA and EMUA will assume the positions as indicated in Fig. 4B. As heretofore explained a particular altitude flight 9 over the ground route under consideration has been set up on the board as indicated by the three tokens 9T in Fig. 4A (four tokens in Fig. 1).

If now the dispatcher desires to transfer to, or rather duplicate the starting time on, his panel board he will depress token 9T for location A. This causes closure of contact 70 associated with the token receptacle in which the starting token 9T is inserted, resulting in the picking up of token relay AER3. Had the token pointed to the left the contact 71 would have closed, the relay AWR3 would have picked up and the westbound instead of the eastbound calculator would have been electrically connected to the transfer mechanism. Upon release of the token the contact 70 will again open. The closure of front contacts 72 and 73 apply respectively positive and negative terminals of a source of current to the two terminals of the clutch coil 63 of each of the digit drums 53 through two circuit controlling drums one associated with the east calculator (unit A) and the other with the indicating shafts 65.

This contact 72 also energizes the aligning magnet 82E (see Fig. 3) which upon being energized causes the V-knife 83 to engage one of the sixty slots between the sixty teeth on wheel 51 to cause the contact arms EMTA and EMUA (see similar arms EMTA and EMUA in Fig. 3) to take positions so that these contacts engage at least one and not more than one stationary contact. Also in order to reduce friction within the calculator the movable contact arms preferably are out of contacting relationship with the stationary contacts except when this magnet 82E is energized.

The front contact 74 of relay AER3 also closes and applies positive potential from the same source to each of the contacts 69 associated with the correspondence cams 66—67 so that if any one of these indicating numbered drums 53 is out of synchronism with its associated indicating shaft 65 the associated clutch coil will be energized through a second circuit. This second circuit for the clutch coil will of course open when synchronization between the indicating drum 53 and the contact drum D has been consummated. The closure of contact 75 of relay AER3 picks up the repeater relay ARR3 which would, by the closure of its front contact 76, apply energizing current to the four lamps 56, 57, 58 and 59 were it not for the fact the energizing circuits for these lamps are open at back contact 77 of relay AER3.

It will be observed that the clutch relay ACR3 has four windings which are respectively connected to the four input terminals of the four clutch coils 63. This clutch repeating relay ACR3 is employed to manifest by its dropping that all of the four numbered drums 53 for that indicator have completed their operation. This relay ACR3 is of course picked up in response to picking up of either of the relays AER3 or AWR3 unless all of the numbered drums 53 were already in correspondence with the indication displayed on the calculator for that station. The moment any one of the clutch magnets 63 for this indicator is energized in response to the picking up of relay AER3 the relay ACR3 picks up and at its front contact 78 closes a stick circuit for this token relay AER3 including the stick contact 79 of this token relay AER3.

Let us now assume that the indicating drums 53 for tier one of the three thousand foot altitude at station A, namely, tier 3000¹, are indicating 00:00, or if desired the numbers may be so placed on the drums so as to indicate 24:00, when the token 9T for the station A is depressed. This depression of the token causes picking up of the relay AER3, and not AWR3, because the token pointed to the right. As heretofore pointed out this causes the repeater stick relay ARR3 to pick up which then sticks up through a stick circuit including its stick contact 80 and the stem of the associated token 9T. Since the first and the fourth indicating drum, namely, the tens hour drum 53 and the units minute drum 53 respectively already assume the same position as assumed by the corresponding contact arms EHTA and EMUA, namely, the zero position, no circuits for the clutch coils 63 for these drums 53 will be completed. A circuit for the units hour indicating drum clutch magnet 63 is however completed which may be traced from the positive terminal of a local source, through front contact 72ª of the relay AER3, through contact arm EHUA, wire 2, conducting drum D2, wire 81, clutch magnet coil 63 for the unit hour indicating drum 53 through front contact 73 of relay AER3 to the negative terminal of the same source.

In the event the numbered indicating drum 53 is not in synchronism with its associated indicating shaft 65 another circuit for this same clutch magnet 63 is closed through front contact 74 of relay AER3 and synchronizing contact 68. With the clutch magnet 63 for the second digit now energized the associated number drum 53 is mechanically connected to the associated motor M and will continue to be rotated until synchronization between this drum 53 of the second digit and the shaft 65 has been concluded. This results in the opening of contact 68 and in continued rotation of this drum 53 until contact drum D2 has rotated to a point where wire 2 and its contact ride on the gap or on an insulated portion of this drum D2 (as shown in Fig. 4B). The numbered drum 53 will then display the number "2" the same as assumed to be displayed in the right-hand column on the hour wheel EHA. In the same manner as just pointed out the third numbered drum 53 is also operated to the position to display and number "2."

All of the four coils of the clutch repeating relay ACR3 are now deenergized thereby opening front contact 78 of this relay and causing deenergization of token relay AER3. The dropping of this relay AER3 at its back contact 77 closes an energizing circuit for each of the lamps 56, 57, 58 and 59 resulting in the display of the starting time 2:20 for flight 9 at station A. It will be noted that the European hour system is employed so as to remove the need for A. M. and P. M. designation.

Let us now assume that the plane has started out and that there is no longer any need of either providing protection against this plane or indicate its starting time. The dispatcher may now withdraw the token 9T at the station A location which will result in the dropping of repeater relay ARR3 and the extinguishment of lamps 56, 57, 58 and 59 for the indicator under consideration. The numerals on the four drums of this indicator are now no longer visible. It should be understood that the tokens need only be momentarily depressed to display the time indication on the panel board and that in practice all the tokens of a particular flight are preferably depressed in rapid succession. The apparatus is so constructed and the speed of the motors are so chosen that a calculation on a calculator can be transferred from such calculator to the panel board in about one second.

In practicing the invention it is proposed that about twenty-four number drums be supported directly over each other and that each of the indicator faces be about one inch square. It is thus seen that the mechanism for operating these drums 53 must be supported directly back of the drum and should not be larger than the face of the indicator. As shown, each vertical row of indicating drums is provided with a single driving shaft 62 and a single indicating shaft 65. The driving shaft 62 is operatively connected to one or more drums 53 by one or more energized clutches and the synchronizing cams are so shaped that the gear 64 can drive the indicating shaft 65 but the indicating shaft 65 cannot drive the gear 64. If more than one clutch magnet 63 is energized at a time and the contact drum, such as drum D1, is out of synchronism with its associated indicating shaft some time may elapse before these two elements get into synchronism because under this condition one of the synchronizing cams 66 may be driven by its gear 64 while the other synchronizing cam 67 is driven by the indicating shaft 65 due to the indicating shaft being driven by some other indicator. Since both of these elements are probably rotated at the same speed and in the same direction no resynchronization of the two cams can take place until the indication shaft is no longer driven due to some other clutch magnet in the same vertical row being energized. After this resynchronization of the two cams 66 and 67 takes place the clutch magnet remains energized only until the indicating drum 53 under consideration gets in synchronism with the calculator contact arm.

One of the difficult problems solved by the present invention, especially the invention as disclosed in the modified construction (Fig. 7) is due to the small amount of space available for the display of each digit of the starting and arrival time indicators on the panel board. The display frame for each digit number should not be larger than one inch square. This problem has been solved in the modified form of the invention shown in Figs. 7, 8, 9 and 10 by the provision of a compact contact drum less than one inch in diameter for each digit the synchronizing shafts 65 and associated synchronizing cams shown in Fig. 4 of the drawings are no longer necessary and have been dispensed with. In view of the intricate mechanism necessary to display these starting and arrival time indications and repairs may at times become necessary it is essential that certain of the indicating apparatus be construed to be detachably associated with the drive shaft. The modified apparatus of Fig. 7 is so constructed that the indicator may be removed from the front of the panel and so that the contact drum which is detachably associated with the illuminated indicator by intermeshed gears may be withdrawn from the rear of the panel.

*Modified construction.*—In Figs. 7, 8, 9 and 10 has been illustrated a modified form of illuminated indicator unit comprising a portion of a vertical shaft 90 which is more or less permanently pivoted in bearing plates 91. These plates 91 (see Figs. 7 and 10), only one being shown, are fastened to vertical struts 92 to which are welded, or otherwise secured, angle bars 93 arranged in pairs to constitute slides into which the indicating unit I and the contact unit J are adapted to slide. It should be noted that these units I and J are not in alignment (see Fig. 10). This non-alignment is due to the fact that the shaft 95 of the indicating unit I must be in alignment with the shaft 90 whereas the shaft 96 of the contact unit J must be out of alignment with this shaft 90 (see Fig. 10).

Referring to Fig. 7 the indicating unit I includes cup 97 of magnetic material in which is contained the clutch coil 98 to constitute an iron-clad clutch magnet having associated therewith a circular armature 99 fixedly pinned or keyed to the shaft 95. The armature 99 is held in its retracted position by a coil spring 100 contained on and surrounding the shaft 95 and located between the armature 99 and the non-magnetic plate 101. A bearing bracket 102 pivotally supports one end of the shaft 95 whereas the other end is supported by a bearing hole in bottom of the cup 97. One end of the shaft 95 is pinned into a double gear 103—104 constituting a bevel pinion 103 and a spur pinion 104. In order to bring this gear and in turn the indicating belt 115 to a sudden stop a braking surface 124 has been provided and so located as to be engaged by the gear 104 when the clutch 98 is deenergized. The other end of the shaft 95 is splined into the bevel pinion 105 to constitute a slidable driving connection, that is, the shaft 95 may be moved endwise against the force of the spring 100 but for all position is in driving relation with the pinion 105. In fact energization of the clutch coil 98 will cause the armature 99 to be attracted to the cup-shaped core, the shaft 95 also being magnetizable, to cause the bevel pinion 103 to mesh with bevel pinion 106 pinned to vertical shaft 90, as a result of which this pinion 106 will rotate bevel pinion 105. The pinion 105 is also pivotally supported in bracket 102.

To the bottom plate of the indicating unit I is secured a pin 107 on which is pivoted the double pinion 108—109 constituting a bevel pinion 108 and a spur gear 109. The bevel pinion 108 meshes with bevel pinion 105 whereas the spur gear 109 meshes with a spur gear 110 connected to the bottom end of the drive pulley 111 pivoted on a pin 112. Near the front of the indicator unit I are two vertically disposed pins 113 (see Fig. 8) on each of which is pivotally supported a preferably transparent roller 114. A translucent belt 115 having numerals painted, or otherwise placed, on the inside thereof so as to be visible only if the compartment inside this belt is illuminated, as by the lamp 116, surrounds the drive pulley 111 and the idler pulleys 114. This belt 115 is preferably perforated to receive short pins 117 so as to assure that this belt 115 maintains a predetermined relation with spur pinion 104 and the spur pinion 118 on the shaft 96 meshed therewith. The front end of the indicating unit I is provided with a cover glass 119 held in place by a bezel 120.

The base for the contact unit J constitutes a U-shaped channel 125 (see Fig. 9) having an up-bent end 125ᵃ (see Fig. 7) against which is fastened a circular insulating plate 129 about which is secured a conducting ring 126. The long sleeve 94 constitutes a bearing for the shaft 96. This conducting ring 126 constitutes a support for the fixed ends of ten contact fingers 0 to 9 inclusive (see Figs. 9 and 11).

In the opposite end of the channel 125 with respect to the conducting ring 126 is secured, as by screws 127ᵃ, a circular insulating plate 127 having two circular rows of eyelets 128 which support front and back contacts also numbered 0 to 9 inclusive cooperatively associated with the contact fingers 0–9 supported by ring 126. Each row of these eyelets 128 is connected to wires 0 to 9, inclusive (see Figs. 7 and 11), by a detachable plug coupler constituting a circular insulating plate 121, provided with pins 122 connected to these wires, as by screws 123. A center pin 122 is also provided to connect wire 133 (see Figs. 7 and 11) to ring 126 through the medium of the jumper 132. The spring fingers 0 to 9 normally, except for one, engage the inner row or back contacts 0–9 inclusive, which one contact is held in engagement with the front contact (contact 0 as shown) by the cam roller 130 pivotally supported in the cam 131 secured to shaft 96 as by the pin shown. The wire 133, as shown in Fig. 11, is in turn at times connected to the positive terminal of a source of current through the medium of front contacts 157 or 158 of relays AER4 and AWR4, respectively.

From the foregoing it is readily seen that if current is applied to the circuit including the clutch magnet coil 98, wire 133 and one of the back contacts normally engaged by the spring fingers supported by conducting ring 126 that the clutch magnet coil 98 will attract its armature 99 to cause bevel pinion 103 to engage rotating bevel pinion 106 as a result of which the belt 115 and the cam 131 will be rotated until the roller 130 operates the spring contact finger through which this current is supplied from the conducting ring 126. That is, the clutch magnet 98 in response to lifting of the contact finger and deenergization of clutch magnet 98 causes the pinions 103 and 106 to be disengaged. The meshed relationship of the various gears and their gear ratios is such that the roller will engage a contact assigned a particular number when that number on the belt 115 appears in the opening of the bezel 120.

*Structure of recorder.*—At the top in Fig. 11 has been illustrated a recorder for recording the starting or arrival time indication displayed on the panel board on a record sheet. In this connection it may be stated that a recorder is very useful or even necessary to avoid the dispatcher placing the blame on the apparatus in the event of an airplane accident due to instructions issued by the dispatcher. Each of the recorders R¹, R², R³ and R⁴ is identical to the indicating contactor unit I—J shown in Fig. 7 aside from three exceptions (1) that the gear 110 directly drives a type wheel 140 one revolution for each revolution of the contact cam 131; (2) that suitable type inking or carbon ribbon for printing is provided; and (3) that the outside contacts or front contacts of the contactor J are omitted.

Referring again to Fig. 11 the four recorder mechanisms R¹, R², R³ and R⁴ are arranged side-by-side in fixed relation with a stationary magnet 141 and have arranged in alignment therewith a time stamp TS, preferably including a synchronous motor driven by alternating current from a source AC, so as to at all times correctly manifest the time of day by suitable time indicating type wheels on the lower face thereof. Directly below the type wheels 140 and below the time stamp TS is provided a roller 142 preferably constructed of hard rubber, and fixedly supported on a shaft 142a pivotally supported in a frame 143 fixedly supported on a shaft 144 pivoted in bearings 145, the construction being such that tilting of the frame 143 about the axis of the shaft 144 will cause the roller 142 to move axially up or down. One end of the frame 143 has integral therewith an armature 143a in magnetic relation with the core of the magnet 141. On the end of the shaft 142a is secured, as by being pinned thereto, a ratchet wheel 147, which has its teeth engage a ratchet dog 148 pivotally supported in fixed bearings 149. A spring 150 urges the dog 148 against or between the teeth of ratchet wheel 147.

The roller 142 is provided with pins 142b engaging holes 151a in a record sheet 151, which sheet is unwound from a record roll 152 when the roller 142 is rotated in a counter-clockwise direction as viewed in Fig. 11. From this construction it is readily seen that the energization of magnet 141 will attract the armature 143a to lift the roller 142 and in turn the record sheet 151 against the type wheels 140 and the time stamp TS to cause the time of day as manifested by the time stamp TS and the time manifested by the type wheels 140 to be printed on the record sheet 151. This lifting of the roller 142 will cause the dog 148 to fall into the next slot between teeth on the ratchet wheel 147. Upon deenergization of the magnet 141 the roller falls back to its normal position and in so doing will rotate the ratchet wheel 147 one tooth and in turn rotate the roller 142 to its next position to advance the record sheet to its next printing position. It is thus seen that energization of the magnet 141 prints a record and deenergization of this magnet advances the record sheet. A recorder such as shown at the top of Fig. 11 of the drawings is provided for each four-digit-indicator on the board.

*Circuit structure Fig. 11.*—In Fig. 11 has been illustrated one particular circuit structure whereby the time indication displayed on the calculator shown in Figs. 2 and 3 may be transferred or duplicated on a four digit indicator, such as shown in Fig. 7, arranged on a panel board such as shown in Fig. 1 employing a token control such as shown in Fig. 4A, and how this indication may be recorded on a recorder R. Fig. 4B shows how like fixed contacts associated with rotating arms EMUA and WMUA for corresponding digits on the eastbound and westbound calculators, respectively, are connected together. In Fig. 11 the stationary contacts 0–9 of the unit minutes digit EMUA and WMUA are similarly connected together at the junction 166 of cables 136 and 137 at which point these contacts are also connected to corresponding back contacts of the contact mechanism J (see Figs. 11 and 7) by a cable 138. The contact mechanism for the recorder unit R4 has for convenience been designated K and the stationary back contacts 0 to 9 have been connected to front contacts 0 to 9 respectively of the contactor J of the unit minute indicator I—J for altitude 4000[1] station A through the medium of a cable 139. The wiring shown in Fig. 11 differs slightly from the wiring shown in Figs. 4A and 4B because no synchronizing cam is employed in the Fig. 11 structure and the recording mechanism R and circuits therefore have been added to Fig. 11.

The token 10T and the relays AWR4, AER4 and ACR4 controlled thereby are the same and are controlled in like manner as similarly designated devices shown in Fig. 4A and for this reason like contacts have been designated by like letter reference characters. An additional and slow acting printing relay APR4 has however been employed. This relay APR4 is controlled by a circuit including back contacts 154 and 155 of relays AWR4 and AER4 respectively and front contact 156 of the repeater relay ARR4 in series. The clutch coil 167 of the recorder R4 is rendered active through front contacts 161 and 162 of relays ARR4 and APR4 respectively, whereas the printing magnet 141 of the recorder is controlled through back contact 163 of relay ARR4 and front contact 164 of slow dropping relay APR4, respectively, in series. Energy is applied to the contact ring 126 of contactor J (see Figs. 7 and 11) through front contacts 157 or 158 of relays AER4 or AWR4, respectively, whereas the contacts 159 and 160 of these two relays select the proper eastbound or westbound calculator by energizing the contact arm EMUA or WMUA as conditions require. Similar circuits are provided for the apparatus of the tens and units hour and the tens minute indicator and recorder units, and this apparatus is duplicated for each four digit indicator and recorder.

*Operation Fig. 11.*—Referring to Fig. 2A for a moment, let us assume that the minute drum EMA is moved to the 21 minute position and that it is desired to transmit this indication to indicators I such as shown in Figs. 7–10 and conventionally shown in Fig. 11. We must of course assume that a flight, which we will for convenience call flight 10, has been set up over a ground route and that this flight is to start at altitude 4000 and at station A and is indicated by flight tokens 10T of which only one has been illustrated in Fig. 11.

Let us refer to Fig. 11 and assume that the dispatcher in his desire to duplicate the 21 minute reading on the eastbound calculator on his digit indicator IJ (see Fig. 7) and that in order to do so he depresses the token 10T. Depression of the token 10T will result in the completion of a circuit for the token relay AER4 through the back contact 70 of the token receptacle, resulting in the energization of this relay AER4. The picking up of the relay AER4 results in the picking up of the repeater relay ARR4 through front contact 75 of the token relay AER4. The picking up of the token relay AER4 also results in the closure of front contacts 157 and 159 of this relay resulting in the completion of an energizing circuit for the clutch magnet 98, which circuit may be traced from the positive terminal of a suitable source of current through front contact 157 of this relay AER4, through wire 133, to contact ring 126, through the particular back contact of the contact mechanism J connected to the stationary contact with which the rotating arm EMUA of the eastbound calculator is in engagement, namely, contact 1, through front contact 159 of the relay AER4, through a multiple path including the clutch coil 98 and one of the coils of the relay ACR4, connected in multiple, to the other or negative terminal of said source. The closure of this circuit will result in the picking up of the clutch repeating relay ACR4 which by the closure of its front contact 73 will complete a stick circuit for the token relay AER4.

Energization of the clutch magnet 98 (see Figs. 7 and 11) will result in attraction of the armature 99 causing the gear 103—104 to be shifted into meshed relation with the bevel pinion 106 contained on the continuously rotating shaft 90. This will result in the operation of the translucent indicating belt 115 and in the rotation of the contact cam 131 until the numeral "1" is presented in the bezel 120 of the indicator and until the cam roller 130 has lifted the contact finger 1 (see Fig. 11) as a result of which the clutch magnet 98 is deenergized to prevent further rotation of the indicating mechanisms. The fourth or unit minute digit is now indicated on the four-unit-indicator I. Deenergization of the clutch magnet 98 is also accompanied by the application of the brake 104—124 and deenergization of the clutch repeating relay ACR4, it being assumed that all of the other three clutch magnets (not shown) have also been deenergized. By reason of the immediate application of the brake 104—124 the entire mechanism of the indicator is brought to a sudden stop and without overrun.

Deenergization of the clutch repeating relay ACR4 causes dropping of the token repeating relay AER4 and the closure of its back contact 155. Since the token repeating relay ARR4 is now energized energizing circuits for the printing relay APR4, and the lamp 116 connected in multiple therewith, including back contacts 154, 155 and front contact 156 of the relays, AWR4, AER4 and ARR4, respectively, in series are closed. Energization of the lamp 116 illuminates the indicating belt 115 (see Fig. 7) to render the numeral "1" painted on the back thereof visible through the cover glass 119. The picking up of the printing relay APR4 results in the closure of an energizing circuit for clutch magnet 167 of the recording unit R$^4$, as well as energization of similar circuits for the other three recording units R$^1$, R$^2$ and R$^3$ (not shown). This circuit may be traced from the (+) terminal of a suitable source of current through front contact 157 of the token relay AER4, wire 133, conducting ring 126 of the contact mechanism J (see Figs. 7 and 11), through front contact 1 of this contactor J held closed by roller 130, through back contact 1 of the contact mechanism K, not yet held open by a roller 130$^c$, through clutch magnet 167 of the recorder R$^4$, through front contacts 162 and 161 of the relays APR4 and ARR4 respectively, to the minus (—) terminal of this same source of current. The completion of this circuit will cause the mechanism and the type wheel 140 of recorder unit R$^4$ to be rotated until the back contact 1 of this recorder has been opened by the roller 130$^c$ at which time the numeral "1" on the printing wheel 140 will be in a position to print this number on the record sheet 151 when the printing magnet 141 of this recorder unit R$^4$ is energized. No energization of this printing magnet or printing will however take place because the token repeating relay ARR4 is still energized through a stick circuit including the stem of the token 10T.

As soon as the airplane has left the starting point, namely, station A, and it is no longer necessary to hold the 4000 foot altitude at station A against occupancy by another airplane the dispatcher will remove his token 10T to thereby cause deenergization of the token repeating relay ARR4. Dropping of the repeater relay ARR4 by the opening of its front contact 156 will cause deenergization of the slow dropping printing relay APR4, but this printing relay will not drop until the printing circuit including the back contact 163 of the relay ARR4 and the front contact 164 of the printing relay APR4 has been temporarily closed. The duration of closure of this circuit will depend upon the period of delayed dropping of this relay APR4 which time is sufficient to allow the printing magnet to lift the printing roller 142 to thereby stamp the complete record, of not only the starting time at station A but also the time of day as manifested by the time stamp TS, upon the recording sheet 151. After this short period of delay the printing relay APR4 will assume its retracted position to thereby cause deenergization of the printing magnet 141. This results in the dropping of the printing roller 142 to its normal retracted position as a result of which the dog 148 engaging the next tooth of the ratchet wheel 147 will cause rotation of this printing roller 142 through an angle to present unused record paper under the type wheels and type stamp for the printing of the next record.

It is thus seen that the momentary depression of the token 10T will result in the indicator I—J being operated into correspondence with the contact mechanism on the eastbound or westbound calculator, as the case may be, depending upon whether this token 10T points to the right or to the left and that as soon as all four of the indicating belts 115 visible through the four windows of the indicator I have all assumed positions in correspondence with the particular indications given by the calculator under consideration deenergization of one coil of the clutch repeating relay ACR4 will take place. As soon as all four clutch magnets of that indicator have been deenergized the corresponding recorder to be operated until the type wheels thereof assume corresponding positions to that of the indicator, and that the recorder will remain in that condition even though the eastbound or westbound calculator, as the case may be, has since been used to calculate the arrival times for another flight and has been operated to new positions, and that upon removal of the token 10T from the token receptacle a record is made on the record sheet 151 of the indicating condition of the indicator on the panel board at the moment the token was removed from its receptacle which is followed by moving of the record sheet 151 to a new position.

The applicants have thus disclosed an arrival time calculator together with means for automatically displaying the calculations on a display or flight progress board and have provided apparatus for recording each displayed indication on a record sheet. This disclosure, in order to convey the purpose of the invention and the functions it is to perform, has been made rather specific but it should be understood that the inventions disclosed herein are not limited to this specific construction and that various changes, modifications, additions and methods of use of the invention may be resorted to without departing from the nature or spirit of the invention except as demanded by the scope of the following claims.

What is claimed as new is:

1. In a schedule calculating means for a conveyance travelling over a route separated into sections by spaced check points, a time indicator for each point, an operator operatively connected to each indicator and effective to move each indicator the same amount to establish the starting time, a calculator organization so operatively connected to each indicator as to move each indicator from its starting time setting an amount proportional to its distance from the entrance end of the route and divided by speed of travel of a conveyance over the route, and an adjusting means individually associated with each point and acting on said calculator organization to move its associated indicator amounts corresponding to travel control factors existing between it and the next preceding point toward the entrance end of the route and at the same time moving the indicators for all succeeding points toward the exit end of the route a corresponding amount.

2. In combination, a dispatcher's board for dispatching airplanes and having miniature flight routes with varying altitudes at the starting point and at each of various check points over a common actual ground route indicatable thereon, an electrically operated time indicator for each of a plurality of starting point altitudes and for each of a plurality of check point altitudes on said board, an arrival time calculator for said board having a starting time dial for said starting point and having an arrival time dial for each check point, a calibrated speed knob and associated means for causing each of said dials to indicate the proper arrival time of an airplane if said starting dial is operated to a position to indicate the starting time of such airplane and said speed knob is operated to a position to indicate the ground speed of such airplane flying over said flight route, contacts for each of said calculator dials for electrically reflecting the indicating position of that dial, means including circuits and a source of current for causing the operation of a selected time indicator for the starting point and each check point for designating a particular flight route over said ground route, each selected indicator being operated to the indicating position corresponding to the starting time and arrival time for the corresponding starting point and check point then indicated on the dials of said arrival time calculator, and manually controlled means for selecting the particular indicator to be operated for the starting point and each check point of the route, said means acting after a selection has been made to allow the operation of the indicators independently of manual control.

3. In combination, a dispatcher's board for dispatching airplanes and having miniature flight routes with different altitudes at the starting point and at each of various check points over a common actual ground route indicatable thereon, an electrically operated time indicator for each of a plurality of starting point altitudes and for each of a plurality of check point altitudes on said board, an arrival time calculator for said board having a starting time dial for said starting point and having an arrival time dial for each check point, a calibrated speed knob and associated means for causing each of said dials to indicate the proper arrival time of an airplane if said starting dial is operated to a position to indicate the starting time of such airplane and said speed knob is operated to a position to indicate the ground speed of such airplane flying over said flight route, other means including a plurality of variable factor knobs, one for the stretch between the starting point and the first check point and one for each stretch between successive check points, each of said knobs acting to adjust all subsequent time dials in accordance with the correction of the arrival time made for its stretch, contacts for each of said calculator dials for electrically reflecting the indicating position of that dial, selecting means effective to select which particular time indicator for the starting point and each check point of the route is to be operated, and means including circuits and a source of current for causing the operation of a selected time indicator for the starting point and each check point for designating a particular flight route over said ground route, each selected indicator being operated to the indicating position corresponding to the starting time and arrival time for the corresponding starting point and check point then indicated on said arrival time calculator.

4. In combination, a dispatcher's board for dispatching airplanes and having miniature flight routes with varying altitudes at the starting point and at each of various check points over a common actual ground route indicatable thereon, an electrically operated indicator for indicating starting time at a starting point altitude and arrival times at each of a plurality of check point altitudes on said board, an arrival time calculator for said board having a starting time dial for said starting point and having an arrival time dial for each check point, a calibrated speed knob and associated means for causing each of said dials to indicate the proper arrival time of an airplane if said starting dial is operated to a position to indicate the starting time of such airplane and said speed knob is operated to a position to indicate the ground speed of such airplane flying over said flight route, contacts for each dial for electrically reflecting the indicating position of such dial, manually controllable means including circuits and a source of current for causing the particular electrically operated indicators designating a particular flight route over said ground route to be operated each to the indicating position to indicate the starting time and arrival time for the corresponding starting point and check point then indicated on said arrival time calculator, recording means, and means including said manually controllable means for recording by said recording means the starting and arrival times displayed on the indicators defining said flight route.

5. In combination, an airplane flight route board depicting in miniature a plurality of flight routes over an actual ground route consisting of a starting point followed by a plurality of check points, said board including an indicator for each altitude of the starting point and an indicator for each altitude for each check point whereon the flight route is defined by a particular indicator for the starting point and one particular indicator for each check point; an arrival time calculator including a dial for indicating the starting time and a dial for indicating arrival time for each check point, and means including a speed knob for operating all of said check point dials to the proper arrival time indication if said speed knob is turned to a particular speed position with the starting dial assuming the starting time position for a plane starting at said starting point at said starting time and flying over said ground route at the speed indicated by said speed knob; manually controlled means for causing the indicators for a particular flight route to indicate the starting and arrival times displayed on said calculator; and other means for recording the starting and arrival times of a particular flight route displayed on said board.

6. In combination, an airplane flight route board depicting in miniature a plurality of flight routes over an actual ground route consisting of a starting point followed by a plurality of check points for each direction of airplane travel, said board including an indicator for each altitude of the starting point and an indicator for each altitude for each check point, and on which board the flight route is defined by a particular indicator for the starting point and one particular indicator for each check point; an arrival time calculator for each direction of airplane travel including a dial for indicating the starting time and a dial for indicating arrival time for each check point, and means for each calculator including a speed knob for operating all of said check point dials to the proper arrival time indication if said speed knob is turned to a particular speed position with the starting dial assuming the starting time position for a plane starting at said starting point at said starting time and flying over said ground route at the speed indicated by said speed knob; manually controlled means for causing the indicators for a particular flight route irrespective of its direction of airplane travel to indicate the starting and arrival times displayed on the said calculator for that direction of airplane travel; and other means for recording the starting and arrival times of a particular flight route displayed on said board.

7. In a flight route display system, the combination with a flight display board including a plurality of fix panels and a plurality of display areas for each fix panel arranged above each other and relating to different altitudes for the various proposed flights, posting units for each display area operable to indicate various arrival times, an arrival time calculator for calculating the arrival time for an airplane at each of a plurality of fixes in response to the setting of the starting time and cruising speed for a proposed airplane flight, means for automatically operating the posting units at one posting area on each of a plurality of fix panels in accordance with the arrival time manifested for such fixes by said calculator, the particular posting area for each fix at which a posting unit is operated being dependent upon the designating altitude at which the airplane is to fly over that fix, and means for designating the altitude at which each proposed flight is to fly over the fixes of its route.

8. In a route display system, the combination with a display board including a plurality of stations and a plurality of display areas for each station, posting units for each display area operable to indicate various arrival times, an arrival time calculator for calculating the arrival time for a conveyance at each of a plurality of stations if the starting time and cruising speed for the conveyance is known, means manually controllable for automatically operating a particular selected posting unit at one posting area at each of a plurality of stations in accordance with the selected altitude and the arrival time for that station manifested by said calculator, and means for recording the indications displayed on said posting units.

9. In a flight route display system, the combination with a flight display board including a plurality of fixes and a plurality of posting units for each fix operable to indicate various arrival times, an arrival time calculator for simultaneously calculating the arrival time for an airplane at each of a plurality of fixes if the starting time and cruising speed for the airplane is made manifest in the calculator, means for automatically operating a selected posting unit at each of a plurality of fixes in accordance with the arrival time for that fix manifested by said calculator, and means for effecting the selection of a vacant posting unit at each fix for each new calculation of an arrival time for that fix.

10. In a route display system, the combination with a display board including a plurality of stations and a plurality of posting units for each station operable to indicate various arrival times, an arrival time calculator for calculating the arrival time for a conveyance at each of a plurality of stations if the starting time and cruising speed for the conveyance is known and manifested in said calculator, means for automatically operating a selected posting unit at each of a plurality of said stations on said display board in accordance with the arrival time for such station manifested by said calculator, and compensating means included in said calculator for each section joining two stations for modifying the calculated arrival times in accordance with special conditions affecting the speed of such conveyance when passing through such sections.

11. In a route display system, the combination with a display board having a fix panel for each of a plurality of stations and a plurality of posting units for each fix panel operable to indicate various arrival times, setting means for designating the starting time and cruising speed for a conveyance, an arrival time calculator for calculating the arrival time for said conveyance at each of a plurality of stations in accordance with the starting time and cruising speed for the conveyance as designated by said setting means, means for automatically operating a posting unit for each of a plurality of said stations represented on said display board in accordance with the arrival time for such stations only provided such stations have been designated as included in a route for said conveyance, and means for manually designating the particular stations included in a proposed route.

12. In an arrival time calculator for calculating arrival time of a conveyance at each of a plurality of spaced points on a route, the combination with a starting time dial and a plurality of arrival time indicators, a speed dial calibrated in miles per hour, a shaft operated by said speed dial through different increments of movement for like speed changes of said speed dial settings so as to always assume a position representing the time required for a conveyance to travel a unit of distance at the speed for which said speed dial is then set, and mechanism governed by said starting time dial and said shaft and constructed in accordance with the distance between said points on said route for causing each of said arrival time indicators to manifest the proper arrival time of a conveyance moving over said route if said starting time dial indicates the starting time and said speed dial assumes a position to manifest the speed of said conveyance.

13. In an arrival time calculator for calculating the arrival time of a conveyance at each of a plurality of spaced points on a route, a speed dial calibrated in miles per hour, a base time setting dial, an arrival time indicating means for each of said spaced points, a plurality of calculating mechanisms, there being one associated with the space between each pair of spaced points, each being controlled by said speed dial and constructed in accordance with the distance of such space for manifesting the travelling time consumed between those two points by a conveyance moving over said route at a speed indicated by the setting of said speed dial, accumulator means interconnecting said mechanisms to effect the successive addition of said travelling times, and other means controlled by said base time dial and said accumulator means for governing said arrival time indicating means for each of said points to indicate the times of arrival of said conveyance at the successive points providing said conveyance starts at a time corresponding to the setting of said base time dial.

14. In an arrival time calculator for calculating the arrival time of a conveyance at each of a plurality of successive stations separated by sections, an indicator for each station adapted to indicate different arrival times, a speed dial, means for each section including mechanism characteristic of its length for calculating the travelling time consumed by a conveyance moving over such section at the speed manifested by said speed dial, correction factor means for each section for modifying the travelling time so calculated for its section, and accumulator means for causing each indicator to indicate the sum of the modified travelling times for all sections to the rear of the station for that indicator.

15. In an airways traffic control system for calculating and posting the time schedules of flights at the spaced fixes of an airway, a flight progress board including changeable time indicating means for each fix, means for governing said time indicating means including a plurality of time wheels relating to different fixes and operable to indicate in hours and minutes any time of the twenty-four hour day, speed setting means for designating the speed of a proposed flight, means for positioning said time wheels for one of said fixes in accordance with a base starting time for said flight, and means including instrumentalities representing the respective distance between said fixes and governed by said speed setting means and said time setting means for positioning the time wheels for each of the other succeeding fixes in accordance with the accumulation of said starting time and the flying times between the fixes up to that fix.

16. In an airways traffic control system for scheduling flights at spaced fixes of an airway, changeable time indicators associated with each of said fixes for displaying the different times of a twenty-four hour day, speed setting means for designating the rated cruising speed for a proposed flight, time setting means for designating the base starting time for said flight, calculating means for automatically determining the flying times between said fixes at the designated speed, adding means for accumulating said flying times in succession and adding such accumulations with said base starting time for each of said fixes to give the respective arrival times for the proposed flight at the successive fixes, and means governed by said calculating and adding means for operating the time indicators for said respective fixes in accordance with said starting time and calculated arrival times to display the time schedule of a flight in actual clock time.

17. In a system of the character described for calculating and posting arrival times for proposed flights at the spaced fixes of an airway, changeable time indicators associated with each of said fixes, means including movable circuit controlling elements for governing the operation of said time indicators, speed setting means operable to represent the different times per unit of distance for the various designated speeds of planes throughout a selected range of speeds, distance devices representing the respective distances between said fixes, and means governed by said speed setting means and said distance devices for automatically positioning said circuit controlling elements for the respective fixes in accordance with the accumulation of the flying times between said fixes with respect to a selected starting time and constituting the arrival times at said fixes.

18. In a system of air traffic control for advance planning the arrival times of a proposed flight at the spaced fixes of an airway, a flight progress board having a panel allocated to each of said fixes, a plurality of changeable time indicators associated with each of said fix panels for posting arrival times of various flights, a master speed setting dial for designating the rated cruising speed for a given proposed flight, time setting means designating a base starting time for such proposed flight, time contactors for each fix operable to their different positions to designate the hours and minutes of any time in a twenty-four hour day, means for selecting a time indicator for each of said fixes and initiating its operation to conform with the existing positions of the associated time contactors, and calculating means controllable by said time setting means and said speed setting dial to conform with a desired base starting time and the rated cruising speed of a proposed flight for automatically calculating the flying times for the successive fix intervals accumulated with respect to the base starting time to operate said time contactors for said different fixes in accordance with the respective arrival times of the proposed flight.

19. In a system of the character described for automatically calculating and posting the arrival times of a proposed flight at spaced fixes of an airway, changeable speed setting means including a shaft representing by its relative angular positions variations in time for a unit of distance for different speeds, circuit controlling means associated with each fix and operable to different contact positions to indicate hours and minutes of a twenty-four hour day, time indicators for said fixes governed in accordance with the existing positions of the corresponding circuit controlling means, and means including a gearing for each fix interval having a gear ratio conforming with the length of that fix interval for operatively connecting said speed shaft and said circuit controlling means for the respective fixes.

20. In a traffic control system for scheduling flights at the spaced fixes of an airway, movable time wheels associated with each of said fixes operable to indicate in hours and in minutes of a twenty-four hour day the calculated arrival time of a proposed flight at that fix, a flight progress board including changeable time indicating means for said fixes governed in accordance with the existing position of said time wheels, setting means for designating the base starting time and rated cruising speed for a proposed flight, and calculating means governed by said speed setting means and including devices representing the distance between said fixes for automatically shifting the positions of said time wheels for said fixes when either or both of said starting time and cruising speed setting means is changed.

21. In an airway traffic controlling system for scheduling flights over a plurality of spaced fixes of an airway, a group of time indicators for each of said plurality of fixes and located on a flight progress board, base time setting means, cruising speed setting means, calculating means governed by said base time setting means and said cruising speed setting means and operating in accordance with the distance between the successive fixes of the airway to calculate the traveling times between said fixes for a proposed flight traveling at a cruising speed manifested by said cruising speed setting means and to add such traveling times in successive accumulation to the proposed starting time manifested by said base time setting means to give the estimated arrival times for the proposed flight at each of said fixes, and posting means governed by said calculating means for causing the group of time indicators for each fix to display the arrival time calculated for that fix.

22. In an airway traffic controlling system for scheduling flights over a route including a plurality of spaced fixes, a flight progress board having a group of time indicators for each of said fixes, base time setting means, cruising speed setting means, calculating means governed by said base time setting means and said cruising speed setting means and operating in accordance with the distance between the successive pairs of fixes in said route to calculate the traveling times between said fixes for a proposed flight traveling at a cruising speed manifested by said cruising speed setting means and adding such traveling times in successive accumulation to the proposed starting time manifested by said base time setting means to give the estimated arrival times for the proposed flight at each of said fixes in the route, posting means at times governed by said calculating means for causing the time indicators for each fix to display the estimated arrival time corresponding to that fix, and recorder means governed by said posting means to record said estimated arrival times for the several fixes of the route concurrently with the control of said time indicators by said posting means.

23. In an airway traffic controlling system for scheduling flights over a plurality of spaced fixes of an airway, a flight progress board having a group of time indicators for each of said fixes, base time setting means capable of being set to mainfest the starting time of a proposed flight from a selected fix, cruising speed setting means capable of being set to manifest the cruising speed of said proposed flight, calculating means governed by said base time setting means and said cruising speed setting means and operating in accordance with the distance between the successive fixes of the airway beginning with the particular fix selected for the starting point of the proposed flight to calculate the traveling times between said fixes for that proposed flight traveling in a selected direction at a cruising speed manifested by said cruising speed setting means and to add such traveling times in successive accumulation to the proposed starting time manifested by said base time setting means to give the estimated arrival times for the proposed flight at each of said fixes beyond the selected starting fix, and posting means governed by said calculating means for causing the group of time indicators for the selected starting fix to be set to display the proposed starting time manifested by said base time setting means and for causing the groups of time indicators for the remaining fixes to display their respective arrival times as calculated for those fixes.

24. In an airway traffic control system for scheduling flights over a plurality of spaced fixes of an airway, a flight progress board including a fix panel for each fix of the airway and each panel having a plurality of display areas, time indicator means associated with each of the display areas for the several fix panels and operable to display different arrival times, an arrival time calculator including setting means operable to be set in accordance with the starting time and cruising speed for any proposed flight, and said calculator acting to automatically calculate the arrival times for that proposed flight over each fix of the airway in accordance with said setting means, means controlled by said arrival time calculator for automatically operating the time indicator means for a selected display area for each fix panel in accordance with the calculated arrival time for that fix, and means associated with each fix panel for selecting the display area of that fix to have its time indicator means operated in accordance with a calculated arrival time for that fix.

25. In an airway traffic control system for scheduling flights over a plurality of spaced fixes of an airway, a flight progress board having a fix panel for each fix of the airway, a plurality of time indicator means located on each fix panel in positions indicative of different altitudes and each time indicator means being operable to display different arrival times, an arrival time calculator for calculating the arrival times for a proposed flight over each fix of the airway in accordance with the setting of the starting time and the cruising speed for that proposed flight, means controlled by said arrival time calculator for automatically operating any selected time indicator means for each fix panel in accordance with the calculated arrival time for the proposed flight over that fix, and manually governable means associated with each fix panel for manually selecting the particular time indicator means of that fix to be operated in accordance with the then calculated arrival time depending upon the altitude assigned to such proposed flight.

26. In an airway traffic control system for scheduling flights over a plurality of spaced fixes of an airway, a flight progress board having a fix panel for each fix of the airway, a plurality of time indicator means for each of the fix panels and each time indicator means being operable to display different arrival times, an arrival time calculator having setting means operable to be set in accordance with the starting time and cruising speed for any proposed flight, said arrival time calculator automatically calculating the arrival times for that proposed flight over the different fixes of the airway in accordance with said setting means, control means governed by said arrival time calculator for automatically causing a selected time indicator means for each fix panel to display the existing calculated arrival time for that fix, means associated with each fix panel for selecting the particular time indicator means to be acted upon by said control means in accordance with the then calculated arrival time for that fix to thereby display on each fix panel the successively calculated arrival times for that fix, and means associated with each fix panel for cancelling the display of the arrival time by any selected time indicator means for that fix panel.

27. In an arrival time calculator for calculating the arrival time of a conveyance at each of a plurality of spaced points on a route, an arrival time indicator for each of said points, a speed dial, a mechanism for the space between each pair of points on the route, each such mechanism acting to calculate the traveling time consumed by a conveyance moving over the distance between the associated pair of spaced points at the speed indicated by the setting of said speed dial, summation means associated with each point for adding the calculated traveling time between that point and the next preceding point to the traveling times calculated by the respective mechanisms for the preceding spaces of the route, and means associated with each point for indicating the total traveling time to that point as accumulated by its associated summation means.

28. In a time schedule calculator for calculating the arrival times of a conveyance at the different spaced check points defining a route extending from a starting point, time indicating means associated with each check point, a base time setting shaft rotatable to different positions in accordance with the starting time of a conveyance from said starting point, a cruising speed dial calibrated in speed beginning at the lowest assumed speed of the conveyance and ranging to infinity by reason of the reciprocal spacing of said speed calibrations on the dial to thereby give angular movements of said speed dial in terms of time per unit of distance, a time shaft rotatable to different positions by said speed dial, a distance gearing for each check point having a gear ratio dependent upon the distance between that point and the next preceding point and operatively driven by the rotation of said time shaft, a transfer shaft for the space between each pair of check points, a differential gear train for each check point for interconnecting the adjoining time transfer shafts at that point and having a drive gear operatively driven by the associated distance gearing, whereby the position of each transfer shaft represents the calculated total traveling time of the conveyance from the starting point up to that check point at which it is driven, and a differential gear associated with each check point and connected to said base time shaft and the transfer shaft driven at that check point to effect the operation of the associated time indicating means to thereby cause it to give the actual arrival time of the conveyance at the corresponding check point, whereby the calculator organization may be initially set up by placing said cruising speed dial at its infinite speed position and all of said time indicating means at positions corresponding to the base time setting of said base time setting shaft.

29. In a calculating machine for calculating arrival times of a conveyance at successive check points of a route, a time indicator for the starting point and for each check point of the route, a cruising speed dial calibrated to indicate various speeds and operatively connected to a control shaft, a starting time shaft operable to be set for different starting times and operatively connected to the time indicator for said starting point, differential gearing for each check point operatively connected to the associated time indicator so as to render such indicator operable by either said starting time shaft or a time indicator drive gear, a transfer shaft for the space between each pair of check points, a transfer differential gear train for each check point for interconnecting the adjoining time transfer shafts at that point and having a transfer drive gear, distance gearing at each check point having a gear ratio dependent on the distance between that check point and the next preceding point of the route and operatively connecting the transfer drive gear to said control shaft, and gear means for each check point operated by the transfer shaft extending to the transfer differential gear for the next succeeding check point for driving the corresponding time indicator drive gear, whereby said time indicator for said starting point indicates the particular starting time in accordance with the position of said starting time shaft and the time indicators for the various check points indicate the proper arrival times for such check points for a conveyance moving over the route at the speed indicated by the setting of said cruising speed dial.

30. In a time schedule calculator for calculating the arrival times of a conveyance at the different spaced check points defining a route extending from a starting point, time indicator means associated with each point, a base starting time setting shaft rotatable to different positions in accordance with the starting time of a conveyance at said starting point and operatively connected to said time indicator for said starting point, a cruising speed dial calibrated to indicate various cruising speeds and operatively connected to a control shaft, a distance gearing for each check point having a gear ratio dependent upon the distance between that point and the next preceding point and operatively driven by said control shaft, a transfer shaft for the space between each pair of check points, a transfer differential gear train for each check point for interconnecting the adjoining transfer shafts at that point and having a driven gear operatively driven by the associated distance gearing, another differential gear train for each check point included in the transfer shaft extending from that check point to the transfer differential gear train for the next succeeding check point and having a drive gear positioned in accordance with a variable factor, a time indicator differential gearing for each check point connected to said base time shaft and to the associated transfer shaft extending to the transfer differential gear train for the next succeeding check point for operatively positioning the time indicator for the associated check point in accordance with the arrival time calculated by the positioning of said speed dial, said base time setting shaft and the variable factor dials for its own and the preceding points.

31. In an arrival time calculator for calculating the arrival time of a conveyance at each of a plurality of spaced points on a route, an arrival time indicator for each of said spaced points, a starting time setting means, speed setting means adapted to be set in accordance with the cruising speed of a conveyance to manifest the time increment required for said conveyance to travel a unit of distance at the set speed, a calculator organization for multiplying said manifested time increment by the distances between the different pairs of spaced points to give the respective traveling times, an accumulator organization controlled by said calculator organization and said starting time setting means for effecting the successive addition of the calculated traveling times with respect to said starting time for giving the respective arrival times for each of the points except the first, and means controlled by said accumulator organization for governing said arrival time indicators in accordance with the starting time and the calculated arrival times to thereby indicate the time schedule of the conveyance.

32. In an arrival time calculator for calculating arrival time of a conveyance at each of a plurality of points on an actual route, a starting time manifesting member, an arrival time manifesting means for each of said points, a speed member adjustable to manifest the speed at which a conveyance may move over said route, a calculating mechanism for each point except the first and constructed in accordance with the distance between said point and the next preceding point on said route for calculating the traveling time between such points in accordance with the speed manifested by said speed member, accumulator means for interrelating said calculating mechanism to effect the successive addition of said traveling times in the order in which the conveyance will pass over the route, and means controlled by said starting time manifesting member for adding the starting time to the successively accumulated traveling times and for causing each of said arrival time manifesting means to manifest the proper arrival time for the corresponding point assuming that said conveyance starts at said starting point at the time manifested by said starting time manifesting member and moves at the speed to which said speed member is then adjusted.

33. In an arrival time calculator for calculating the arrival time of a conveyance at a point located a predetermined distance from a starting point, a time indicator for the distant point, a starting time setting means, a speed setting means adapted to be set in accordance with the cruising speed of the conveyance to manifest the time increment required for said conveyance to travel a unit of distance at the set speed, a calculator mechanism constructed in accordance with the predetermined distance and governed by said speed setting means to multiply the manifested time increment by said predetermined distance to give the calculated traveling time, a time correction factor setting means adapted to be set in accordance with a correcting time factor, and accumulator means governed by said calculator mechanism, said time factor setting means and said starting time setting means to add the correcting time factor to the calculated traveling time and to the set starting time to give a calculated arrival time and also acting to control said time indicator to indicate the calculated arrival time.

34. In an arrival time calculator for calculating the arrival time of a conveyance at each of a plurality of spaced points on a route, an arrival time indicator for each of said spaced points, a starting time setting means, speed setting means adapted to be set in accordance with the cruising speed of the conveyance to manifest the time increment required for said conveyance to travel a unit of distance at the set speed, a calculator organization for multiplying said manifested time increment by the distances between the different pairs of spaced points to give the respective traveling times, a variable time factor setting means for the space between each pair of points adapted to be set to manifest a selected correction time interval dependent upon traveling conditions through the corresponding space, an accumulator organization controlled by said calculator organization and said starting time setting means for effecting the successive addition of the calculated traveling times between the successive fixes together with their respective correction time intervals with respect to said starting time for giving the respective arrival times for each of said points except the first, and means controlled by said accumulator organization for governing said arrival time indicators in accordance with the starting time and the calculated arrival times to thereby indicate the time schedule of the conveyance in accordance with traveling conditions throughout the entire route.

SEDGWICK N. WIGHT.
OSCAR S. FIELD.

REFERENCES CITED

The following references are of record in the file of this patent:

UNITED STATES PATENTS

| Number | Name | Date |
| --- | --- | --- |
| 241,519 | Turner | May 17, 1881 |
| 773,515 | Muzzy | Oct. 25, 1904 |
| 1,024,071 | Goss | Apr. 23, 1912 |
| 1,070,835 | Nowak | Aug. 19, 1913 |
| 1,084,671 | Tallmadge | Jan. 20, 1914 |
| 1,170,480 | Duffie | Feb. 1, 1916 |
| 1,179,358 | Heuser | Apr. 11, 1916 |
| 1,927,702 | Foss | Sept. 19, 1933 |
| 2,071,184 | Stewart et al. | Feb. 16, 1937 |
| 2,113,348 | Hutchinson | Apr. 5, 1938 |
| 2,136,672 | Ealkins | Nov. 15, 1938 |
| 2,167,513 | Johnston | July 25, 1939 |
| 2,236,077 | Smith | Mar. 25, 1941 |
| 2,236,793 | Furber | Apr. 1, 1941 |
| 2,302,769 | Haselton | Nov. 24, 1942 |
| 2,305,779 | Hebel | Dec. 22, 1942 |
| 2,320,337 | Bryce | June 1, 1943 |
| 2,323,374 | Bugg | July 6, 1943 |